(12) United States Patent
Soroushian

(10) Patent No.: US 10,645,429 B2
(45) Date of Patent: *May 5, 2020

(54) SYSTEMS AND METHODS FOR ENCODING AND STREAMING VIDEO ENCODED USING A PLURALITY OF MAXIMUM BITRATE LEVELS

(71) Applicant: DIVX, LLC, San Diego, CA (US)

(72) Inventor: Kourosh Soroushian, San Diego, CA (US)

(73) Assignee: DIVX, LLC, San Diego, CA (US)

( * ) Notice: Subject to any disclaimer, the term of this patent is extended or adjusted under 35 U.S.C. 154(b) by 182 days.

This patent is subject to a terminal disclaimer.

(21) Appl. No.: 15/922,198

(22) Filed: Mar. 15, 2018

(65) Prior Publication Data

US 2018/0278975 A1   Sep. 27, 2018

Related U.S. Application Data

(63) Continuation of application No. 13/600,046, filed on Aug. 30, 2012, now Pat. No. 9,955,195.
(Continued)

(51) Int. Cl.
*H04N 21/2343* (2011.01)
*H04N 19/115* (2014.01)
(Continued)

(52) U.S. Cl.
CPC ... *H04N 21/234372* (2013.01); *H04N 19/115* (2014.11); *H04N 19/146* (2014.11);
(Continued)

(58) Field of Classification Search
CPC ......... H04N 21/234372; H04N 19/146; H04N 19/172
See application file for complete search history.

(56) References Cited

U.S. PATENT DOCUMENTS 3,919,474 A   11/1975   Benson
4,974,260 A   11/1990   Rudak
(Continued)

FOREIGN PATENT DOCUMENTS

CN   1662952 A   8/2005
CN   102138327 A   7/2011
(Continued)

OTHER PUBLICATIONS

Extended European Search Report for European Application EP12828956.8, Report Completed Feb. 18, 2015, dated Mar. 2, 2015, 13 pgs.
(Continued)

*Primary Examiner* — Zhubing Ren
(74) *Attorney, Agent, or Firm* — KPPB LLP

(57) ABSTRACT

Systems and methods for streaming and playing back video having a variety of resolutions, frame rates, and/or sample aspect ratios, where the video streams are encoded at one of a number of maximum bit rate levels, in accordance with embodiments of the invention are disclosed. One embodiment includes a processor, and storage containing data relating combinations of resolution and frame rates to maximum bitrates, where a plurality of resolution and frame rates that are related to the same maximum bitrate form a maximum bitrate level. In addition, an encoding application configures the processor to encode a video stream as a plurality of video streams having different resolutions and frame rates, where the target maximum bitrate used during the encoding is selected based upon the maximum bitrate levels of the resolution and frame rate combinations indicated within the data relating combinations of resolution and frame rates to maximum bitrates.

18 Claims, 15 Drawing Sheets

Related U.S. Application Data

(60) Provisional application No. 61/529,201, filed on Aug. 30, 2011.

(51) Int. Cl.
  *H04N 19/146* (2014.01)
  *H04N 19/157* (2014.01)
  *H04N 21/2662* (2011.01)

(52) U.S. Cl.
  CPC ..... *H04N 19/157* (2014.11); *H04N 21/23439* (2013.01); *H04N 21/234381* (2013.01); *H04N 21/2662* (2013.01)

(56) References Cited

U.S. PATENT DOCUMENTS

| | | |
|---|---|---|
| 5,912,710 A | 6/1999 | Fujimoto |
| 6,005,621 A | 12/1999 | Linzer et al. |
| 6,157,410 A | 12/2000 | Izumi et al. |
| 6,430,354 B1 | 8/2002 | Watanabe |
| 6,920,179 B1 | 7/2005 | Anand et al. |
| 8,396,114 B2 | 3/2013 | Gu et al. |
| 8,767,825 B1 | 7/2014 | Wang et al. |
| 8,818,171 B2 | 8/2014 | Soroushian et al. |
| 9,215,466 B2 | 12/2015 | Zhai et al. |
| 9,344,721 B2 | 5/2016 | Dikvall |
| 9,467,708 B2 | 10/2016 | Soroushian et al. |
| 9,510,031 B2 | 11/2016 | Soroushian et al. |
| 9,955,195 B2 | 4/2018 | Soroushian |
| 2003/0142872 A1 | 7/2003 | Koyanagi |
| 2004/0150747 A1 | 8/2004 | Sita |
| 2004/0208245 A1 | 10/2004 | Macinnis et al. |
| 2005/0089091 A1 | 4/2005 | Kim et al. |
| 2005/0157948 A1 | 7/2005 | Lee |
| 2005/0210145 A1 | 9/2005 | Kim et al. |
| 2006/0015813 A1 | 1/2006 | Chung et al. |
| 2006/0039481 A1 | 2/2006 | Shen et al. |
| 2006/0126717 A1 | 6/2006 | Boyce et al. |
| 2007/0024706 A1 | 2/2007 | Brannon, Jr. et al. |
| 2007/0053293 A1 | 3/2007 | Mcdonald et al. |
| 2008/0030614 A1 | 2/2008 | Schwab |
| 2008/0052306 A1 | 2/2008 | Wang et al. |
| 2008/0137848 A1 | 6/2008 | Kocher et al. |
| 2008/0196076 A1 | 8/2008 | Shatz et al. |
| 2008/0253454 A1 | 10/2008 | Imamura et al. |
| 2008/0266522 A1 | 10/2008 | Weisgerber |
| 2009/0116821 A1 | 5/2009 | Shibamiya et al. |
| 2009/0300204 A1 | 12/2009 | Zhang et al. |
| 2010/0002069 A1 | 1/2010 | Eleftheriadis et al. |
| 2010/0262712 A1* | 10/2010 | Kim ............... H04N 21/234327 709/231 |
| 2010/0278271 A1 | 11/2010 | MacInnis |
| 2011/0022432 A1 | 1/2011 | Ishida et al. |
| 2011/0082924 A1 | 4/2011 | Gopalakrishnan |
| 2011/0099594 A1 | 4/2011 | Chen et al. |
| 2011/0126104 A1 | 5/2011 | Woods et al. |
| 2011/0164679 A1* | 7/2011 | Satou ............... H04N 19/172 375/240.03 |
| 2011/0170408 A1 | 7/2011 | Furbeck et al. |
| 2011/0280307 A1 | 11/2011 | MacInnis et al. |
| 2012/0173751 A1 | 7/2012 | Braness et al. |
| 2012/0177101 A1 | 7/2012 | van der Schaar |
| 2012/0179834 A1 | 7/2012 | van der Schaar et al. |
| 2012/0281767 A1 | 11/2012 | Duenas et al. |
| 2013/0051767 A1 | 2/2013 | Soroushian et al. |
| 2013/0051768 A1 | 2/2013 | Soroushian et al. |
| 2013/0058393 A1 | 3/2013 | Soroushian |
| 2013/0169863 A1 | 7/2013 | Smith |
| 2014/0355958 A1 | 12/2014 | Soroushian et al. |
| 2017/0026445 A1 | 1/2017 | Soroushian et al. |
| 2017/0041604 A1 | 2/2017 | Soroushian et al. |

FOREIGN PATENT DOCUMENTS

| | | | |
|---|---|---|---|
| CN | 103858419 A | | 6/2014 |
| CN | 103875248 A | | 6/2014 |
| CN | 103875248 B | | 9/2018 |
| CN | 108989847 A | | 12/2018 |
| EP | 1335603 A2 | | 8/2003 |
| HK | 1195183 B | | 2/2018 |
| JP | 2009508452 A | | 2/2009 |
| KR | 20140056317 A | | 5/2014 |
| KR | 101928910 B1 | | 12/2018 |
| KR | 10-1936142 B1 | | 1/2019 |
| KR | 10-1981923 B1 | | 5/2019 |
| KR | 10-2020764 B1 | | 9/2019 |
| WO | 2010111261 A1 | | 9/2010 |
| WO | 2010150470 A1 | | 12/2010 |
| WO | 2011053658 A1 | | 5/2011 |
| WO | 2011059291 A2 | | 5/2011 |
| WO | 2011087449 A1 | | 7/2011 |
| WO | 2011093835 A1 | | 8/2011 |
| WO | 2011102791 A1 | | 8/2011 |
| WO | 2013033334 A1 | | 3/2013 |
| WO | 2013033335 A1 | | 3/2013 |
| WO | 2013033458 A2 | | 3/2013 |
| WO | 2013033458 A3 | | 5/2013 |

OTHER PUBLICATIONS

International Preliminary Report on Patentability for International Application No. PCT/US2012/053052, Completed Mar. 4, 2014, 8 pgs.
International Preliminary Report on Patentability for International Application No. PCT/US2012/053223, Report dated Mar. 4, 2014, 7 pgs.
International Search Report and Written Opinion for International Application No. PCT/US2012/053052, International Filing Date Aug. 30, 2012, Report Completed Oct. 25, 2012, dated Nov. 16, 2012, 9 pgs.
International Search Report and Written Opinion for International Application No. PCT/US2012/053223, International Filing Date Aug. 30, 2012, Report Completed Dec. 7, 2012, dated Mar. 7, 2013, 10 pgs.
International Search Report and Written Opinion for International Application PCT/US2012/053053, search completed Oct. 23, 2012, dated Nov. 13, 2012, 11 pgs.
International Search Report for International Application No. PCT/SE2011/050166, Search completed Mar. 30, 2011, dated Mar. 30, 2011, 5 pgs.
"Transparent end-to-end packet switched streaming service (PSS); 3GPP file format (3GP) (Release 9)", 3GPP TS 26.244 V9.0.0 (Dec. 2009), sections 7.1-7.4, 52 pgs.
Akhshabi et al., "An Experimental Evaluation of Rate-Adaptation Algorithms in Adaptive Streaming over HTTP", MMSys'11, Feb. 23-25, 2011, 12 pgs.
Fecheyr-Lippens, "A Review of HTTP Live Streaming", Internet Citation, Jan. 25, 2010, 38 pgs.
Ozer, Jan "Adaptive Streaming in the Field", Streaming Media, Dec. 2010-Jan. 2011, 9 pgs.
Watson, Mark "Input for DASH EE#1 (CMP): Pixel Aspect Ratio", 94. MPEG Meeting; Oct. 11, 2010-Oct. 15, 2010; Guangzhou; (Motion Picture Expert Group or ISO/IEC JTC1/SC29/WG11), No. M18498, Oct. 28, 2010 (Oct. 28, 2010), XP030047088,, Oct. 2, 2010, 4 pgs.

* cited by examiner

| Actual Resolution | DivX Plus Bitrate | Final Resolution | Frames Per Second | Level | Average Bitrate for Level | Maximum Profile Bitrate |
|---|---|---|---|---|---|---|
| 1920x1080 | 8969 | 1920x1080 | 30 | 9 | 8435 | 8400 |
| 1920x1080 | 8482 | 1920x1080 | 25 | | | |
| 1920x1040 | 7854 | 1920x1040 | 24 | | | |
| 1440x1080 | 5747 | 1920x1080 | 30 | 8 | 5378 | 5300 |
| 1440x1080 | 5438 | 1920x1080 | 25 | | | |
| 1920x816 | 5406 | 1920x816 | 24 | | | |
| 1920x800 | 5248 | 1920x800 | 24 | | | |
| 1440x1040 | 5053 | 1920x1040 | 24 | | | |
| 1440x816 | 3557 | 1920x816 | 24 | 7 | 3508 | 3500 |
| 1440x800 | 3459 | 1920x800 | 24 | | | |
| 1280x720 | 2736 | 1920x1080 | 30 | 6 | 2666 | 2400 |
| 1280x720 | 2596 | 1920x1080 | 25 | | | |
| 960x720 | 1895 | 1920x1080 | 30 | 5 | 1742 | 1750 |
| 1152x624 | 1860 | 1920x1040 | 24 | | | |
| 960x720 | 1802 | 1920x1080 | 25 | | | |
| 1280x544 | 1789 | 1920x816 | 24 | | | |
| 1152x480 | 1366 | 1920x800 | 24 | | | |
| 960x544 | 1281 | 1920x816 | 24 | 4 | 1144 | 1200 |
| 960x520 | 1220 | 1920x1040 | 24 | | | |
| 960x400 | 931 | 1920x800 | 24 | | | |
| 768x432 | 857 | 1920x1080 | 30 | 3 | 796 | 800 |
| 768x432 | 822 | 1920x1080 | 25 | | | |
| 768x416 | 783 | 1920x1040 | 24 | | | |
| 720x408 | 720 | 1920x816 | 24 | | | |
| 768x320 | 600 | 1920x800 | 24 | 2 | 600 | 600 |
| 576x312 | 456 | 1920x1040 | 24 | 1 | 418 | 400 |
| 640x272 | 445 | 1920x816 | 24 | | | |
| 512x288 | 407 | 1920x1080 | 30 | | | |
| 512x288 | 400 | 1920x1080 | 25 | | | |
| 576x240 | 382 | 1920x800 | 24 | | | |

FIG. 5

| Streaming Bitrate | Aspect Ratio, Frames Per Second | | | | |
|---|---|---|---|---|---|
| | 16:9, 29.97 or 30 | 16:9, 25 | 1.85:1, 23.976 or 24 | 2.35:1, 23.976 or 24 | 2.4:1, 23.976 or 24 |
| 400 | 768x432 | 768x432 | 768x416 | 768x328 | 768x320 |
| 600 | 768x432 | 768x432 | 768x416 | 768x328 | 768x320 |
| 800 | 768x432 | 768x432 | 768x416 | 768x328 | 768x320 |
| 1200 | 768x432 | 768x432 | 768x416 | 768x328 | 768x320 |
| 1750 | 1280x720 | 1280x720 | 1152x624 | 1280x544 | 1152x480 |
| 2400 | 1280x720 | 1280x720 | 1152x624 | 1280x544 | 1152x480 |
| 3500 | 1920x1080 | 1920x1080 | 1920x1040 | 1920x816 | 1920x800 |
| 5300 | 1920x1080 | 1920x1080 | 1920x1040 | 1920x816 | 1920x800 |
| 8400 | 1920x1080 | 1920x1080 | 1920x1040 | 1920x816 | 1920x800 |

FIG. 6

SYSTEMS AND METHODS FOR ENCODING AND STREAMING VIDEO ENCODED USING A PLURALITY OF MAXIMUM BITRATE LEVELS

CROSS-REFERENCE TO RELATED APPLICATIONS

The current application is a continuation of U.S. patent application Ser. No. 13/600,046, filed Aug. 30, 2012, which claims priority to U.S. Provisional Patent Application No. 61/529,201, filed Aug. 30, 2011, the disclosures of which are incorporated herein by reference.

FIELD OF THE INVENTION

The present invention relates to the delivery of multimedia content, specifically streaming video content encoded at a variety of recommended maximum bitrates optimized for a variety of scaled display resolutions and network connection maximum data rates of playback devices receiving the streams.

BACKGROUND OF THE INVENTION

The term streaming media describes the playback of media on a playback device, where the media is stored on a server and continuously sent to the playback device over a network during playback. Typically, the playback device stores a sufficient quantity of media in a buffer at any given time during playback to prevent disruption of playback due to the playback device completing playback of all the buffered media prior to receipt of the next portion of media. Adaptive bitrate streaming or adaptive streaming involves detecting the present streaming conditions (e.g. the user's network bandwidth and CPU capacity) in real time and adjusting the quality of the streamed media accordingly.

In adaptive streaming systems, the source media is typically stored on a media server as a top level index file pointing to a number of alternate streams that contain the actual video and audio data. Each stream is typically stored in one or more container files. Different adaptive streaming solutions typically utilize different index and media containers. The Matroska container is a media container developed as an open standard project by the Matroska non-profit organization of Aussonne, France. The Matroska container is based upon Extensible Binary Meta Language (EBML), which is a binary derivative of the Extensible Markup Language (XML). Decoding of the Matroska container is supported by many consumer electronics (CE) devices. The DivX Plus file format developed by DivX, LLC of San Diego, Calif. utilizes an extension of the Matroska container format, including elements that are not specified within the Matroska format.

SUMMARY OF THE INVENTION

Systems and methods in accordance with embodiments of the invention stream and play back video having a variety of resolutions, frame rates, and/or sample aspect ratios, where the video streams are encoded at one of a limited number of maximum bit rate levels. One embodiment includes a processor, and storage containing an encoding application and data relating combinations of resolution and frame rates to maximum bitrates, where a plurality of resolution and frame rates that are related to the same maximum bitrate form a maximum bitrate level. In addition, the encoding application configures the processor to encode a video stream as a plurality of video streams having different resolutions and frame rates, where the target maximum bitrate used during the encoding of the video streams is selected based upon the maximum bitrate levels of the resolution and frame rate combinations indicated within the data relating combinations of resolution and frame rates to maximum bitrates.

In a further embodiment, the resolution and frame rates within a maximum bitrate level have optimal target maximum bitrates that are within a predetermined percentage of the highest optimal target maximum bitrate of a resolution and frame rate combination within the maximum bitrate level.

In another embodiment, the optimal target maximum bitrate of a resolution and frame rate combination is determined using a formula.

In a still further embodiment, the optimal target maximum bitrate of a resolution and frame rate combination is determined using experimentation.

In still another embodiment, the resolution and frame rates within a maximum bitrate level have optimal target maximum bitrates that are within a predetermined percentage of the optimal target maximum bitrate of at least one other resolution and frame rate combination within the maximum bitrate level.

In a yet further embodiment, the data relating combinations of resolution and frame rates to maximum bitrate levels relates the resolution and frame rates to maximum bitrates in the manner illustrated in FIG. 5.

Yet another embodiment includes a plurality of playback devices, where the playback devices have different display aspect ratios and utilize different types of network connections, and a streaming system comprising a plurality of servers on which a plurality of video streams are stored, where the plurality of video streams are encoded at different resolutions and frame rates. In addition, video streams stored on the streaming system are encoded using one of a plurality of maximum bitrate levels, where video streams having different resolutions and frame rates are encoded at the same maximum bitrate level, the playback devices are configured to support playback of video data encoded at maximum bitrates corresponding to a plurality of the maximum bitrate levels, the playback devices are configured to request video data from at least one video stream from the streaming system encoded at a maximum bitrate level supported by the playback device, and the playback devices are configured to playback video data encoded at a supported maximum bitrate level received from the streaming system.

A further embodiment again also includes a source encoder including storage containing data relating combinations of resolution and frame rates to maximum bitrate levels. In addition, the source encoder is configured to encode a video stream as a plurality of video streams having different resolutions and frame rates, where the target maximum bitrate used during the encoding of the video streams is selected based upon the maximum bitrate levels of the resolution and frame rate combinations indicated within the data relating combinations of resolution and frame rates to maximum bitrates levels.

In another embodiment again, the data relating combinations of resolution and frame rates to maximum bitrate levels relates the resolution and frame rates to maximum bitrate levels in the manner illustrated in FIG. 5.

A further additional embodiment includes a machine readable medium containing processor instructions, where execution of the instructions by a processor causes the processor to perform a process for determining a set of maximum bitrate levels for encoding video data for use in a streaming system including playback devices having different display aspect ratios and network connections. In addition, the process includes selecting a set of resolution and frame rate combinations, determining the optimal target maximum bitrate for encoding a stream of video data at each resolution and frame rate combination, grouping the resolution and frame rate combinations into maximum bitrate levels based upon the optimal target maximum bitrates of the resolution and frame rate combinations utilizing at least one grouping criterion, and determining a target maximum bitrate for the resolution and frame rate combinations in a maximum bitrate level.

In another additional embodiment, the optimal target maximum bitrate of a resolution and frame rate combination is determined using a formula.

In a still yet further embodiment, the optimal target maximum bitrate of a resolution and frame combination is determined using experimentation.

In still yet another embodiment, the at least one grouping criterion groups resolution and frame rates within a maximum bitrate level that have optimal target maximum bitrates that are within a predetermined percentage of the highest optimal target maximum bitrate of a resolution and frame rate combination within the maximum bitrate level.

In a still further embodiment again, the at least one grouping criterion groups resolution and frame rates within a maximum bitrate level that have optimal target maximum bitrates that are within a predetermined percentage of the optimal target maximum bitrate of at least one other resolution and frame rate combination within the maximum bitrate level.

In still another embodiment again, determining a target maximum bitrate for the resolution and frame rate combinations in a maximum bitrate level includes selecting the maximum optimal target bitrate of a resolution and frame rate combination within the maximum bitrate level.

In a still further additional embodiment, determining a target maximum bitrate for the resolution and frame rate combinations in a maximum bitrate level includes selecting the minimum optimal target bitrate of a resolution and frame rate combination within the maximum bitrate level.

In still another additional embodiment, determining a target maximum bitrate for the resolution and frame rate combinations in a maximum bitrate level includes selecting the average optimal target bitrate of the resolution and frame rate combinations within the maximum bitrate level.

A yet further embodiment again also includes rounding the average optimal target bitrate using a predetermined rounding function.

In yet another embodiment again, determining a target maximum bitrate for the resolution and frame rate combinations in a maximum bitrate level includes selecting one of a plurality known network data rates based upon the optimal target data rate of at least one of the resolution and frame rate combinations within the maximum bitrate level.

BRIEF DESCRIPTION OF THE DRAWINGS

FIG. 5 is a table illustrating an example of a set of resolutions with encoded bitrates matched to maximum profile bitrates in accordance with an embodiment of the invention.

FIG. 6 is a table illustrating an example of sets of resolutions for different aspect ratios, where the resolutions in each set are encoded so that each aspect ratio is encoded at a resolution falling within each of the maximum bitrate levels in accordance with an embodiment of the invention.

DETAILED DISCLOSURE OF THE INVENTION

Figure 1:
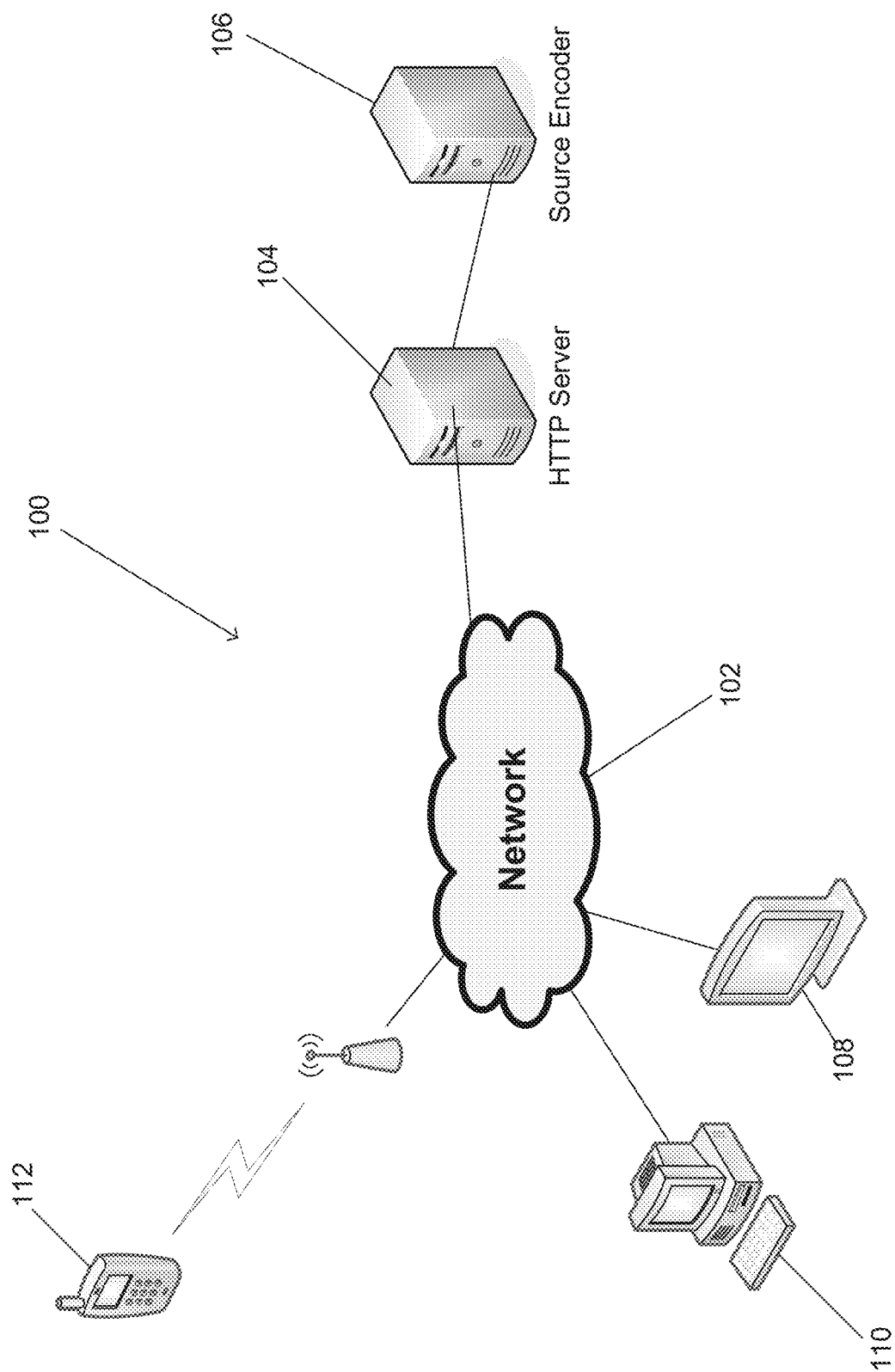
FIG. 1 is a network diagram of a level bitrate adaptive streaming system in accordance with an embodiment of the invention.

Turning now to the drawings, systems and methods for streaming and playing back video having a variety of resolutions, frame rates, and/or sample aspect ratios, where the video streams are encoded at one of a limited number of maximum bit rate levels, in accordance with embodiments of the invention are illustrated. Video data is typically encoded to achieve a target maximum bitrate. The quality of video encoded with a specific resolution, and frame rate typically does not improve appreciably beyond a specific maximum bitrate threshold. Beyond that threshold, increasing the resolution of the encoded video can increase video quality. A formula can be used to recommend an optimal target maximum bitrate at which to encode video content at a specific resolution and frame rate efficiently and with the highest video quality achievable at the selected resolution. Alternatively, the bitrate threshold at which video quality does not appreciably improve can be determined through testing. While it can be beneficial to determine the optimal maximum bitrate at which to encode a specific piece of video content to efficiently achieve the highest quality video at a specific resolution and frame rate, the delivery of a large number of streams of video content to a large variety of playback devices can be simplified by specifying a limited number of maximum bitrates at which video can be encoded irrespective of the optimal target maximum bitrate for a specific frame rate and resolution combination. The ability of a specific type of playback device to playback video encoded at a specific maximum bitrate is typically confirmed via testing. Therefore, the smaller the number of maximum bitrate levels supported by a streaming system, the simpler the process of testing each playback device to confirm its ability to playback video encoded at supported target maximum bitrates. Accordingly, streaming systems can utilize a set of maximum bitrate levels to simply the process of certifying playback devices for use within the streaming system. When video is encoded for distribution via the streaming system at a number of different resolutions and frame rates, the maximum bitrate levels appropriate to each of the specific resolution and frame combinations can be selected and used as the target maximum bitrates when encoding the streams of video data.

In several embodiments, the process of selecting a set of maximum bitrate levels to use when encoding video for distribution via a streaming system involves determining the most popular aspect ratios and frame rates for video content and then determining all of the streaming resolutions and frame rates at which the video content will be encoded. When the most likely resolution and frame rate combinations are identified, the optimal target maximum bitrates for each resolution and frame rate combination can be determined using an appropriate bitrate formula or testing. Bitrate formulas that can be utilized to determine a optimal target maximum bitrate at which to encode video at a specified resolution and frame rate are discussed in U.S. patent application Ser. No. 13/432,521 entitled "Systems and Methods for Encoding Alternative Streams of Video for Playback on Playback Devices having Predetermined Display Aspect Ratios and Network Connection Maximum Data Rates", to Soroushian et al., filed Mar. 28, 2012 (the disclosure of which is incorporated by reference herein in its entirety). The optimal target maximum bitrates can then be grouped into levels and a maximum bitrate determined for each level.

In several embodiments, the resolution and frame rate combinations can be grouped into levels based upon their corresponding optimal target maximum bitrates so that all optimal target maximum bitrates within a group are within a predetermined percentage of the highest optimal target maximum bitrate within the group. In many embodiments, the resolution and frame rate combinations can be grouped into levels based upon their corresponding optimal target maximum bitrates so that each optimal target maximum bitrate within the group is within a predetermined percentage of the next highest optimal target maximum bitrate within the group. In other embodiments, any of a variety of grouping criteria can be utilized in accordance with embodiments of the invention including criteria that group resolution and frame rate combinations into a predetermined number of groups based upon their optimal target maximum bitrates.

The maximum bitrate that is assigned to the resolution and frame rate combinations at a level can be determined in any number of different ways including (but not limited to) the average bitrate of the optimal target maximum bitrates included in the group, the minimum bitrate of the optimal target maximum bitrates included in the level, and/or a typical network connection data rate that is close to one or more of the target maximum bitrates in the level. The maximum bitrate determined for each level can then be used to encode content at the resolution and frame rate combinations within the level. In several embodiments, the process of determining the maximum bitrate levels is performed in a first process and the maximum bit rate levels and the resolution and frame rate combinations that fall within each level can be provided to a source encoding system for use in the encoding of video content.

In many embodiments, the streaming system is an adaptive bitrate streaming system. Adaptive bitrate streaming systems can stream alternative streams of video data encoded at maximum bitrates. In order to provide the highest quality video experience independent of the network data rate, the adaptive bitrate streaming systems switch between the available streams of video data throughout the delivery of the video data according to a variety of factors, including, but not limited to, the available network data rate and video decoder performance. Systems and methods for switching between video streams during playback are disclosed in U.S. patent application Ser. No. 13/221,682 entitled "Systems and Methods for Adaptive Bitrate Streaming of Media Stored in Matroska Container Files Using Hypertext Transfer Protocol" to Braness et al., filed Aug. 30, 2011, the disclosure of which is incorporated by reference herein in its entirety. In adaptive bitrate streaming systems, a number of alternative streams are likely to be encoded having the same aspect ratio, but different resolutions. Systems and methods for selecting the resolutions at which to encode alternative streams of video for use in adaptive bitrate streaming systems are described in U.S. patent application Ser. No. 13/430,032 entitled "Selection of Resolutions for Seamless Resolution Switching of Multimedia Content" to Soroushian et al., filed Mar. 26, 2012 (the disclosure of which is incorporated by reference herein in its entirety). Although much of the discussion that follows references adaptive bitrate streaming systems, systems and methods in accordance with embodiments of the invention can be utilized in streaming systems that are non-adaptive. Systems and methods for streaming video at a plurality of resolution and frame rates using a smaller set of maximum bit rate levels in accordance with embodiments of the invention are discussed further below.

System Overview

A streaming system in accordance with an embodiment of the invention is illustrated in FIG. 1. The streaming system 100 includes a source encoder 106 configured to encode source video as a number of alternative video streams. Alternative streams are streams that encode the same media content in different ways. In many instances, alternative streams encode media content (such as but not limited to video) at different resolution and sample aspect ratio combinations and different maximum bitrates. In a number of embodiments, alternative video streams form sets of alternative video streams encoded with the same aspect ratio corresponding to the display aspect ratio of a set of playback devices. In many embodiments, the source encoder possesses a lookup table that indexes resolution and frame rate combinations to a predetermined set of maximum bitrate levels. The source encoder uses the lookup table to determine the target maximum bitrate at which to encode video at a specific resolution and frame rate combination.

In many embodiments, the streaming system is an adaptive bitrate streaming system and the source encoder encodes each alternative stream into a separate container file and generates a top level index file describing each of the streams contained within the container files. The top level index file and the container files are uploaded to an HTTP server 104. In other embodiments, the container files are uploaded to an HTTP server 104 and the top level index file is dynamically generated in response to a request for a specific piece of content by a playback device. In the illustrated embodiment, the source encoder is a server. In other embodiments, the source encoder can be any processing device including a processor and sufficient resources to perform the transcoding of source media (including but not limited to video, audio, and/or subtitles).

In the illustrated embodiment, playback devices include personal computers 110, CE players 108, and mobile phones 112. In other embodiments, playback devices can include consumer electronics devices such as DVD players, Blu-ray players, televisions, set top boxes, video game consoles, tablets, and other devices that are capable of connecting to a server via HTTP and playing back encoded media. In the illustrated embodiment, a variety of playback devices use HTTP or another appropriate stateless protocol to request portions of a top level index file and the container files via a network 102 such as the Internet. Prior to a playback device performing adaptive bitrate streaming using portions of media from alternative streams contained within the container files, a bandwidth probe can be performed by the playback device to determine available bandwidth. Once the bandwidth probe has been completed, the playback device can utilize data within the top level index including (but not limited to) the maximum bitrate of each of the available streams to determine the initial streams from which to commence requesting portions of encoded media as part of an adaptive streaming process.

Once playback of content from the initial set of streams commences, the playback device utilizes the top level index to perform adaptive bitrate streaming of the content in response to changes in streaming conditions. In many adaptive bitrate streaming systems, the playback device can progress through a series of operational phases in which the playback device responds differently in each phase to changes in the streaming conditions. In a number of embodiments, stability in streaming conditions or improving streaming conditions can result in a transition to a phase in which the playback device assumes stable operating conditions, buffers more content, and is less responsive to fluctuations in streaming conditions. In many embodiments, a deterioration in streaming conditions results in a stream switch to a set of streams at a lower resolution utilizing less bandwidth and resulting in the playback device transitioning to a phase in which the playback device assumes unstable operating conditions, buffers less content, and responds rapidly to variations in streaming conditions.

File Structure

Figure 7:
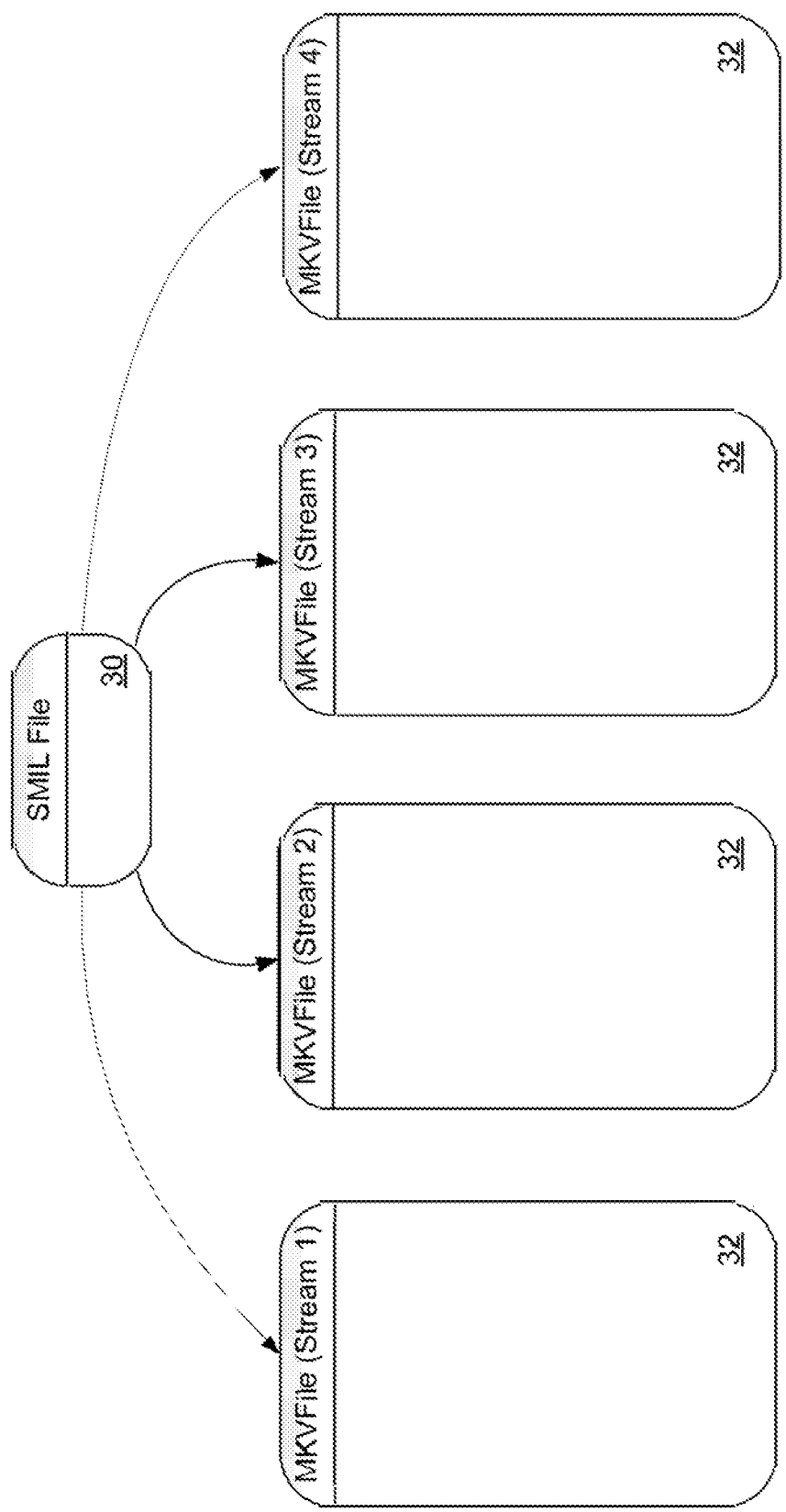
FIG. 7 conceptually illustrates a top level index file and Matroska container files generated by the encoding of source media in accordance with embodiments of the invention.

Files generated by a source encoder and/or stored on an HTTP server for streaming to playback devices in accordance with embodiments of the invention are illustrated in FIG. 7. The files utilized in the adaptive bitrate streaming of the source media include a top level index 30 and a plurality of container files 32 that each contain at least one stream. The top level index file describes the content of each of the container files. As is discussed further below, the top level index file can take a variety of forms including an SMIL file and the container files can take a variety of forms including a specialized Matroska container file.

In many embodiments, each Matroska container file contains a single stream. For example, the stream could be one of a number of alternate video streams, an audio stream, one of a number of alternate audio streams, a subtitle stream, one of a number of alternate subtitle streams, a trick play stream, or one of a number of alternate trick play streams. In several embodiments, the Matroska container file includes multiple multiplexed streams. For example, the Matroska container could include a video stream, and one or more audio streams, one or more subtitle streams, and/or one or more trick play streams. As is discussed further below, in many embodiments the Matroska container files are specialized files. The encoding of the media and the manner in which the media is stored within Cluster elements within the Matroska container file can be subject to constraints designed to enhance the performance of an adaptive bitrate streaming system. In addition, the Matroska container file can include index elements that facilitate the location and downloading of Cluster elements from the various Matroska container files during the adaptive streaming of the media. Top level index files and Matroska container files that can be used in adaptive bitrate streaming systems in accordance with embodiments of the invention are discussed below.

Top Level Index Files

Playback devices in accordance with many embodiments of the invention utilize a top level index file to identify the container files that contain the streams available to the playback device for use in adaptive bitrate streaming. In many embodiments, the top level index files can include references to container files that each include an alternative stream of encoded media. The playback device can utilize the information in the top level index file to retrieve encoded media from each of the container files according to the streaming conditions experienced by the playback device.

In several embodiments, the top level index file provides information enabling the playback device to retrieve information concerning the encoding of the media in each of the container files and an index to encoded media within each of the container files. In a number of embodiments, each container file includes information concerning the encoded media contained within the container file and an index to the encoded media within the container file and the top level index file indicates the portions of each container file containing this information. Therefore, a playback device can retrieve the top level index file and use the top level index file to request the portions of one or more of the container files that include information concerning the encoded media contained within the container file and an index to the encoded media within the container file. A variety of top level index files that can be utilized in adaptive bitrate streaming systems in accordance with embodiments of the invention are discussed further below.

Top Level Index SMIL Files

In a number of embodiments, the top level index file utilized in the adaptive bitrate streaming of media is a SMIL file, which is an XML file that includes a list of URIs describing each of the streams and the container files that contain the streams. The URI can include information such as the "system-bitrate" of the stream contained within the stream and information concerning the location of specific pieces of data within the container file.

The basic structure of a SMIL file involves providing an XML declaration and a SMIL element. The SMIL element defines the streams available for use in adaptive bitrate streaming and includes a HEAD element, which is typically left empty and a BODY element that typically only contains a PAR (parallel) element. The PAR element describes streams that can be played simultaneously (i.e. include media that can be presented at the same time).

The SMIL specification defines a number of child elements to the PAR element that can be utilized to specify the streams available for use in adaptive bitrate streaming. The VIDEO, AUDIO and TEXTSTREAM elements can be utilized to define a specific video, audio or subtitle stream. The VIDEO, AUDIO and TEXTSTREAM elements can collectively be referred to as media objects. The basic attributes of a media object are the SRC attribute, which specifies the full path or a URI to a container file containing the relevant stream, and the XML:LANG attribute, which includes a 3 letter language code. Additional information concerning a media object can be specified using the PARAM element. The PARAM element is a standard way within the SMIL format for providing a general name value pair. In a number of embodiments of the invention, specific PARAM elements are defined that are utilized during adaptive bitrate streaming.

In many embodiments, a "header-request" PARAM element is defined that specifies the size of the header section of the container file containing the stream. The value of the "header-request" PARAM element typically specifies the number of bytes between the start of the file and the start of the encoded media within the file. In many embodiments, the header contains information concerning the manner in which the media is encoded and a playback device retrieves the header prior to playback of the encoded media in order to be able to configure the decoder for playback of the encoded media. An example of a "header-request" PARAM element is follows:

```
<param
    name="header-request"
    value="1026"
    vauetype="data"/>
```

In a number of embodiments, a "mime" PARAM element is defined that specifies the MIME type of the stream. A "mime" PARAM element that identifies the stream as being an H.264 stream (i.e. a stream encoded in accordance with the MPEG-4 Advanced Video Codec standard) is as follows:

```
<param
    name="mime"
    value="V_MPEG4/ISO/AVC"
    valuetype="data"/>
```

The MIME type of the stream can be specified using a "mime" PARAM element as appropriate to the encoding of a specific stream (e.g. AAC audio or UTF-8 text stream).

When the media object is a VIDEO element, additional attributes are defined within the SMIL file format specification including the systemBitrate attribute, which specifies the bitrate of the stream in the container file identified by the VIDEO element, and width and height attributes, which specify the dimensions of the encoded video in pixels. Additional attributes can also be defined using the PARAM element. In several embodiments, a "vbv" PARAM element is defined that specified the VBV buffer size of the video stream in bytes. The video buffering verifier (VBV) is a theoretical MPEG video buffer model used to ensure that an encoded video stream can be correctly buffered and played back at the decoder device. An example of a "vbv" PARAM element that specifies a VBV size of 1000 bytes is as follows:

```
<param
    name="vbv"
    value="1000"
    valuetype="data"/>
```

An example of VIDEO element including the attributes discussed above is as follows:

```
<video
    src="http://cnd.com/vdeo1_620kbps.mkv"
    systemBitrate="620"
    width="480"
    height="270">
    <param
    name="vbv"
    value="1000"
    valuetype="data"
</video>
```

Adaptive bitrate streaming systems in accordance with embodiments of the invention can support trick play streams, which can be used to provide smooth visual search through source content encoded for adaptive bitrate streaming. A trick play stream can be encoded that appears to be an accelerated visual search through the source media when played back, when in reality the trick play stream is simply a separate track encoding the source media at a lower frame rate. In many embodiments of the system a VIDEO element that references a trick play track is indicated by the systemProfile attribute of the VIDEO element. In other embodiments, any of a variety of techniques can be utilized to signify within the top level index file that a specific stream is a trick play stream. An example of a trick play stream VIDEO element in accordance with an embodiment of the invention is as follows:

```
<video
    src="http://cnd.com/video_test2_600kbps.mkv"
    sytemProfile="DivXPlusTrickTrack"
    width="480"
    <param name="vbv" value="1000" valuetype="data"/>
    <param name="header-request" value="1000" valuetype="data"/>
</video>
```

In a number of embodiments of the invention, a "reservedBandwidth" PARAM element can be defined for an AUDIO element. The "reservedBandwidth" PARAM element specifies the bitrate of the audio stream in Kbps. An example of an AUDIO element specified in accordance with an embodiment of the invention is as follows:

```
<audio
    src="http://cnd.com/audio_test1_277 kbps.mkv"
    xml lang="gem"
<param
    name="reservedBandwidth"
    value="128"
    valuetype="data"/>
/>
```

In several embodiments, the "reservedBandwidth" PARAM element is also defined for a TEXTSTREAM element. An example of a TEXTSTREAM element including a "reservedBandwidth" PARAM element in accordance with an embodiment of the invention is as follows:

```
<textstream
    src="http://cnd.com/text_stream_ger.mkv"
    xml:lang="gem"
<param
    name="reservedBandwidth"
```

```
        value="32"
        valuetype="data" I>
/>
```
In other embodiments, any of a variety of mechanisms can be utilized to specify information concerning VIDEO, AUDIO, and SUBTITLE elements as appropriate to specific applications.

A SWITCH element is a mechanism defined within the SMIL file format specification that can be utilized to define adaptive or alternative streams. An example of the manner in which a SWITCH element can be utilized to specify alternative video streams at different bitrates is as follows:

```
<switch>
    <video                    src="http://cnd.com/video_test1_300kbps.mkv"/>
    <video                    src="http://cnd.com/video_test2_900kbps.mkv"/>
    <video                    src="http://cnd.com/video_test3_1200kbps.mkv"/>
</switch>
```

The SWTICH element specifies the URLs of three alternative video streams. The file names indicate that the different bitrates of each of the streams. As is discussed further below, the SMIL file format specification provides mechanisms that can be utilized in accordance with embodiments of the invention to specify within the top level index SMIL file additional information concerning a stream and the container file in which it is contained.

In many embodiments of the invention, the EXCL (exclusive) element is used to define alternative tracks that do not adapt during playback with streaming conditions. For example, the EXCL element can be used to define alternative audio tracks or alternative subtitle tracks. An example of the manner in which an EXCL element can be utilized to specify alternative English and French audio streams is as follows:

```
<excl>
    <audio
    src="http://cnd.com/english-audio.mkv"
    xml:lang="eng"/>
    <audio
    src="http://cnd.com/french-audio.mkv"
    xml:lang="fre"/>
</exc>
```

An example of a top level index SMIL file that defines the attributes and parameters of two alternative video levels, an audio stream and a subtitle stream in accordance with an embodiment of the invention is as follows:

```
<?xml version="1.0" encoding="utf-8"?>
<smil.xmins="http://www.w3.org/ns/SMIL" version="3.0" baseProfile="Language">
    <head>
    </head>
    <body>
        <par>
            <switch>
                <video
                    src="http://cnd.com/video_test1_300kbps.mkv"
                    systemBitrate="300"
                    vbv="600"
                    width="320"
                    height="240">
                    <param
                        name="vbv"
                        value="600"
                        valuetype="date"/>
                    <param
                        name="header-request"
                        value="1000"
                        valuetype="data"/>
                </video>
                <video
                    src="http://cnd.com/video_test2_600kbps.mkv"
                    systemBitrate="600"
                    vbv="900"
                    width="640"
                    height="480">
                    <param
                        name="vbv"
                        value="1000"
                        valuetype="data"
                    <param
                        name="header-request"
                        value="1000"
                        valuetype="data" t>
                </video>
            </switch>
            <audio
                src="http://cnd.com/audio.mkv"
                xml:lang="eng">
                <param
                    name="header-request"
                    value="1000"
                    valuetype="data"
                <param name="reservedBandwidth" value="128"
                    valuetype="data"/>
            </audio>
            <textstream
                src="http://cnd.com/subtities.mkv"
                xml:lang="eng">
                <param
                    name="header-request"
                    value="data"/>
                <param name="reservedBandwidth" value="32"
                    valuetype="data"/>
            </textstream>
        </par>
    </body>
</smil>
```

The top level index SMIL file can be generated when the source media is encoded for playback via adaptive bitrate streaming. Alternatively, the top level index SMIL file can be generated when a playback device requests the commencement of playback of the encoded media. When the playback device receives the top level index SMIL file, the playback device can parse the SMIL file to identify the available streams. The playback device can then select the streams to utilize to playback the content and can use the SMIL file to identify the portions of the container file to download to obtain information concerning the encoding of a specific stream and/or to obtain an index to the encoded media within the container file.

Although top level index SMIL files are described above, any of a variety of top level index file formats can be utilized to create top level index files as appropriate to a specific application in accordance with an embodiment of the invention. The use of top level index files to enable playback of encoded media using adaptive bitrate streaming in accordance with embodiments of the invention is discussed further below.

Storing Media in Matroska Files for Adaptive Bitrate Streaming

Figure 8:
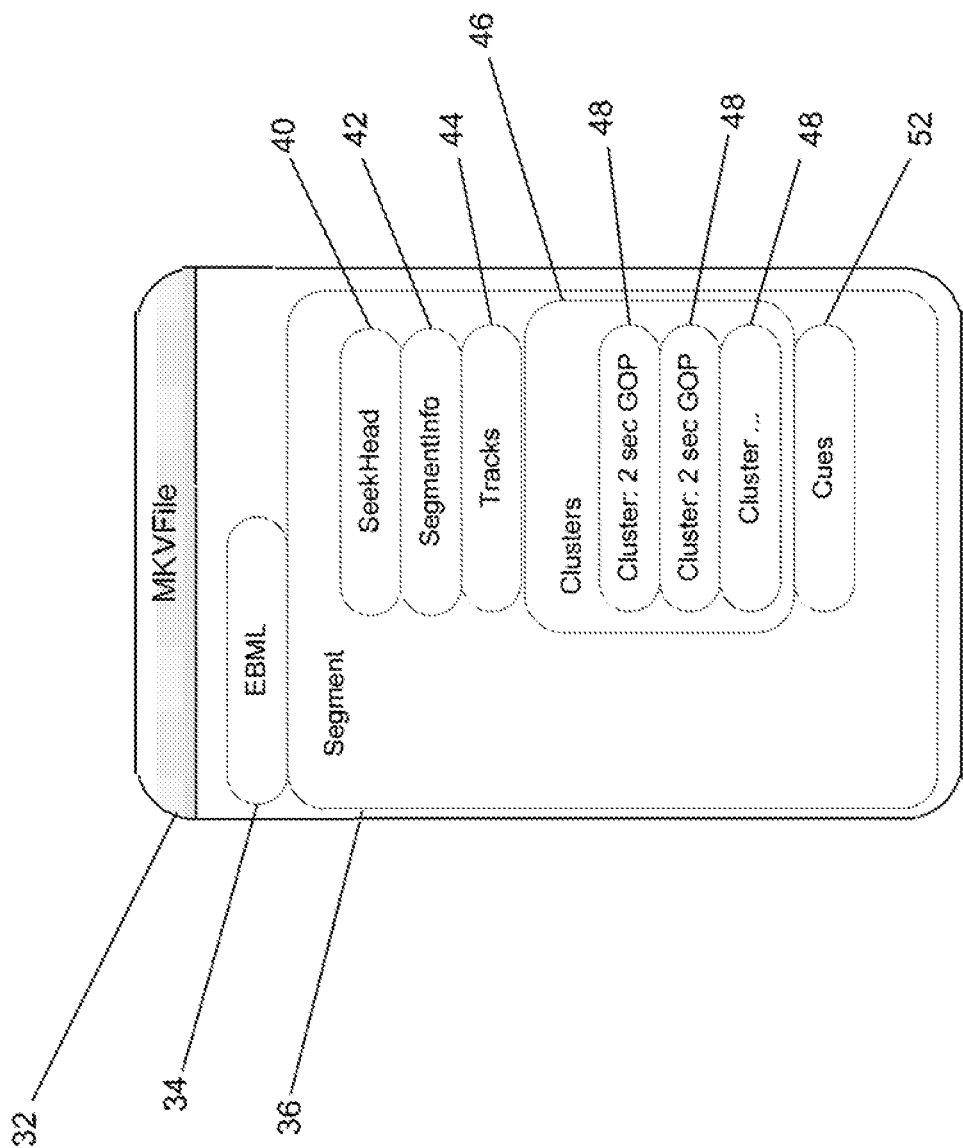
FIG. 8 conceptually illustrates a specialized Matroska container file incorporating a modified Cues element in accordance with an embodiment of the invention.

A Matroska container file used to store encoded video in accordance with an embodiment of the invention is illustrated in FIG. 8. The container file 32 is an Extensible Binary Markup Language (EBML) file that is an extension of the Matroska container file format. The specialized Matroska container file 32 includes a standard EBML element 34, and a standard Segment element 36 that includes a standard Seek Head element 40, a standard Segment Information element 42, and a standard Tracks element 44. These standard elements describe the media contained within the Matroska container file. The Segment element 36 also includes a standard Clusters element 46. As is described below, the manner in which encoded media is inserted within individual Cluster elements 48 within the Clusters element 46 is constrained to improve the playback of the media in an adaptive streaming system. In many embodiments, the constraints imposed upon the encoded video are consistent with the specification of the Matroska container file format and involve encoding the video so that each cluster includes at least one closed GOP commencing with an IDR frame. In addition to the above standard elements, the Segment element 36 also includes a modified version of the standard Cues element 52. As is discussed further below, the Cues element includes specialized CuePoint elements (i.e. non-standard CuePoint elements) that facilitate the retrieval of the media contained within specific Cluster elements via HTTP.

The constraints imposed upon the encoding of media and the formatting of the encoded media within the Clusters element of a Matroska container file for adaptive bitrate streaming and the additional index information inserted within the container file in accordance with embodiments of the invention is discussed further below.

Encoding Media for Insertion in Cluster Elements

An adaptive bitrate streaming system provides a playback device with the option of selecting between different streams of encoded media during playback according to the streaming conditions experienced by the playback device. In many embodiments, switching between streams is facilitated by separately pre-encoding discrete portions of the source media in accordance with the encoding parameters of each stream and then including each separately encoded portion in its own Cluster element within the stream's container file. Furthermore, the media contained within each cluster is encoded so that the media is capable of playback without reference to media contained in any other cluster within the stream. In this way, each stream includes a Cluster element corresponding to the same discrete portion of the source media and, at any time, the playback device can select the Cluster element from the stream that is most appropriate to the streaming conditions experienced by the playback device and can commence playback of the media contained within the Cluster element. Accordingly, the playback device can select clusters from different streams as the streaming conditions experienced by the playback device change over time. In several embodiments, the Cluster elements are further constrained so that each Cluster element contains a portion of encoded media from the source media having the same duration. In a number of embodiments, each Cluster element includes two seconds of encoded media. The specific constraints applied to the media encoded within each Cluster element depending upon the type of media (i.e. video, audio, or subtitles) are discussed below.

Figure 9B:
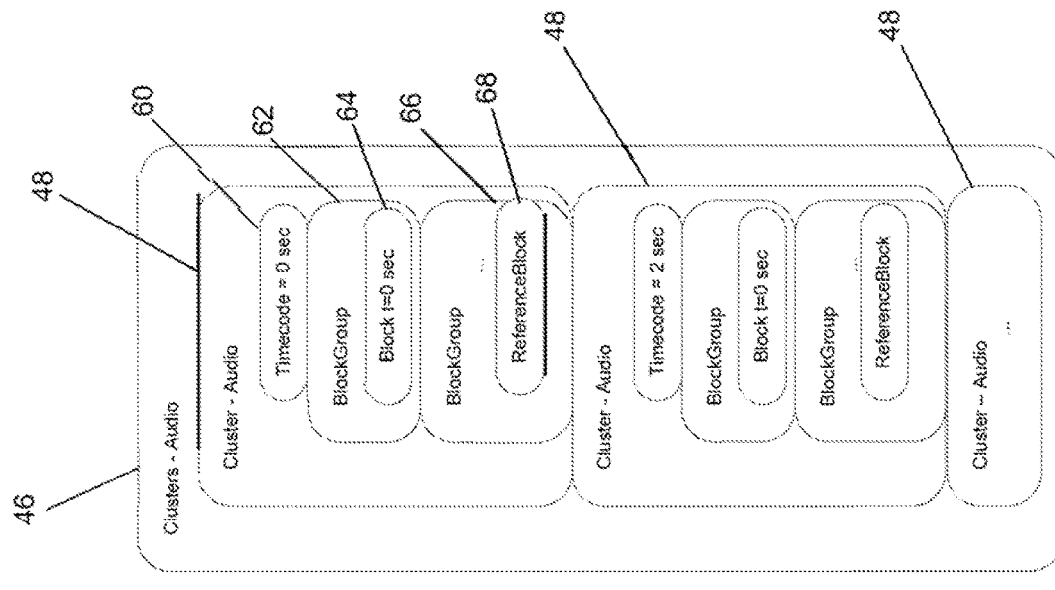
FIGS. 9*a*-9*c* conceptually illustrate the insertion of different types of media into the Clusters element of a Matroska container file subject to various constrains that facilitate adaptive bitrate streaming in accordance with embodiments of the invention.
Figure 9A:
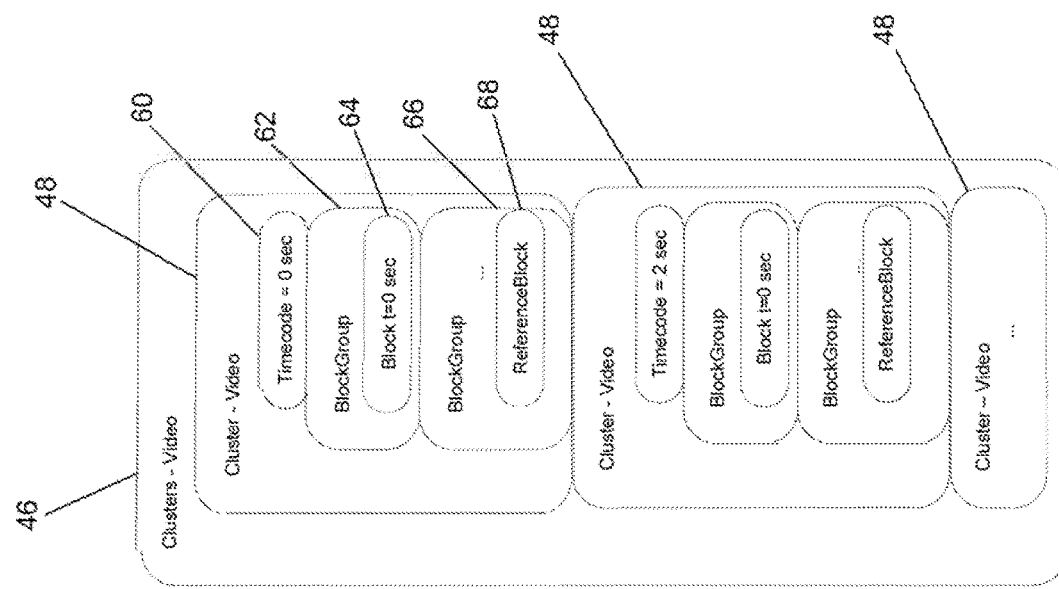

A Clusters element of a Matroska container file containing a video stream in accordance with an embodiment of the invention is illustrated in FIG. 9a. The Clusters element 46 includes a plurality of Cluster elements 48 that each contains a discrete portion of encoded video. In the illustrated embodiment, each Cluster element 48 includes two seconds of encoded video. In other embodiments, the Cluster elements include encoded video having a greater or lesser duration than two seconds. The smaller the Cluster elements (i.e. the smaller the duration of the encoded media within each Cluster element), the higher the overhead associated with requesting each Cluster element. Therefore, a tradeoff exists between the responsiveness of the playback device to changes in streaming conditions and the effective data rate of the adaptive streaming system for a given set of streaming conditions (i.e. the portion of the available bandwidth actually utilized to transmit encoded media). In several embodiments, the encoded video sequences in the Cluster elements have different durations. Each Cluster element 48 includes a Timecode element 60 indicating the start time of the encoded video within the Cluster element and a plurality of BlockGroup elements. As noted above, the encoded video stored within the Cluster is constrained so that the encoded video can be played back without reference to the encoded video contained within any of the other Cluster elements in the container file. In many embodiments, encoding the video contained within the Cluster element as a GOP in which the first frame is an IDR frame enforces the constraint. In the illustrated embodiment, the first BlockGroup element 62 contains an IDR frame. Therefore, the first BlockGroup element 62 does not include a ReferenceBlock element. The first BlockGroup element 62 includes a Block element 64, which specifies the Timecode attribute of the frame encoded within the Block element 64 relative to the Timecode of the Cluster element 48. Subsequent BlockGroup elements 66 are not restricted in the types of frames that they can contain (other than that they cannot reference frames that are not contained within the Cluster element). Therefore, subsequent BlockGroup elements 66 can include ReferenceBlock elements 68 referencing other BlockGroup element(s) utilized in the decoding of the frame contained within the BlockGroup or can contain IDR frames and are similar to the first BlockGroup element 62. As noted above, the manner in which encoded video is inserted within the Cluster elements of the Matroska file conforms with the specification of the Matroska file format.

Figure 9D:
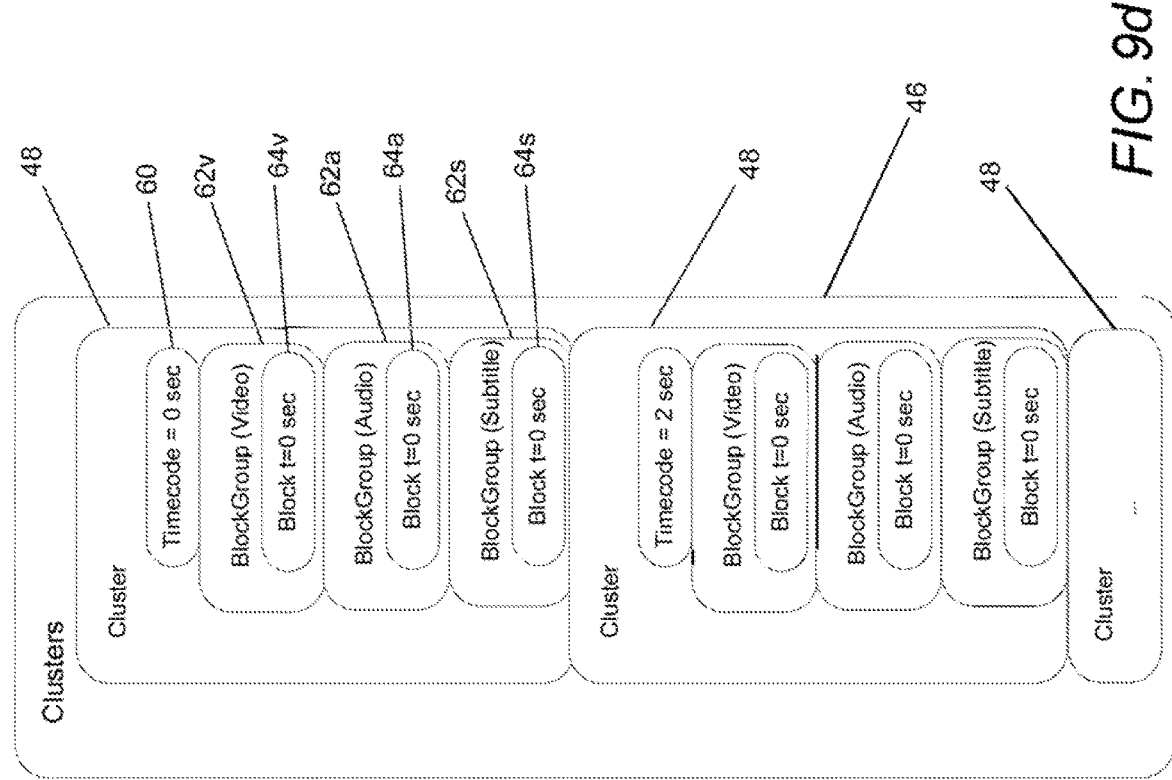
FIG. 9*d* conceptually illustrates the multiplexing of different types of media into the Clusters element of a Matroska container file subject to various constraints that facilitate adaptive bitrate streaming in accordance with an embodiment of the invention.
Figure 9C:
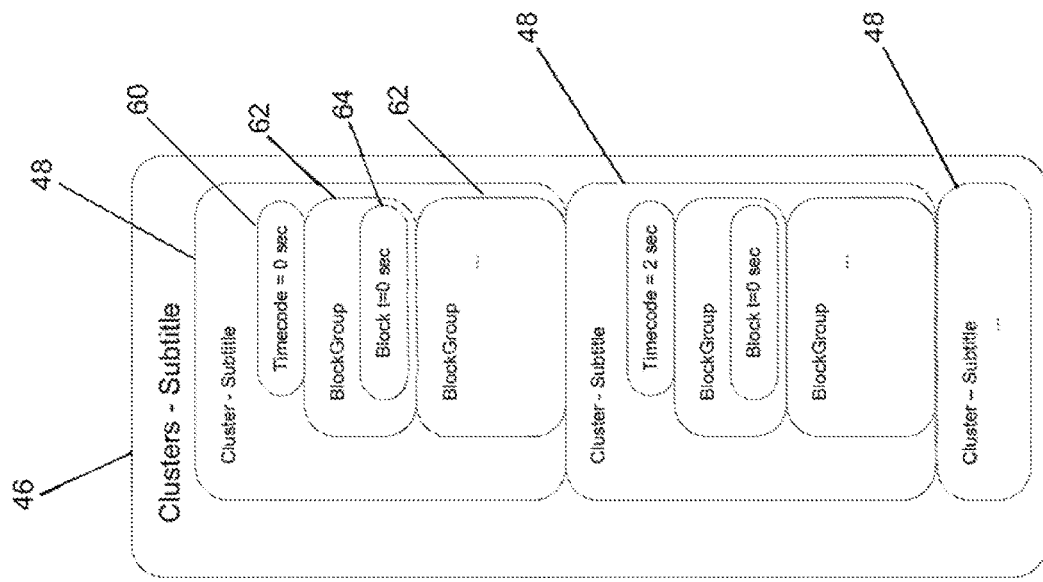

The insertion of encoded audio and subtitle information within a Clusters element 46 of a Matroska container file in accordance with embodiments of the invention is illustrated in FIGS. 9b and 9c. In the illustrated embodiments, the encoded media is inserted within the Cluster elements 48 subject to the same constraints applied to the encoded video discussed above with respect to FIG. 9a. In addition, the duration of the encoded audio and subtitle information within each Cluster element corresponds to the duration of the encoded video in the corresponding Cluster element of the Matroska container file containing the encoded video. In other embodiments, the Cluster elements within the container files containing the audio and/or subtitle streams need not correspond with the start time and duration of the Cluster elements in the container files containing the alternative video streams.

Multiplexing Streams in a Single MKV Container File

The Clusters elements shown in FIGS. 9a-9c assume that a single stream is contained within each Matroska container file. In several embodiments, media from multiple streams is multiplexed within a single Matroska container file. In this way, a single container file can contain a video stream multiplexed with one or more corresponding audio streams, and/or one or more corresponding subtitle streams. Storing the streams in this way can result in duplication of the audio and subtitle streams across multiple alternative video streams. However, the seek time to retrieve encoded media from a video stream and an associated audio, and/or subtitle stream can be reduced due to the adjacent storage of the data on the server. The Clusters element 46 of a Matroska container file containing multiplexed video, audio and subtitle data in accordance with an embodiment of the invention is illustrated in FIG. 9*d*. In the illustrated embodiment, each Cluster element 48 includes additional BlockGroup elements for each of the multiplexed streams. The first Cluster element includes a first BlockGroup element 62*v* for encoded video that includes a Block element 64*v* containing an encoded video frame and indicating the Timecode attribute of the frame relative to the start time of the Cluster element (i.e. the Timecode attribute 60). A second BlockGroup element 62*a* includes a Block element 64*a* including an encoded audio sequence and indicating the timecode of the encoded audio relative to the start time of the Cluster element, and a third BlockGroup element 62*s* including a Block element 64*s* containing an encoded subtitle and indicating the timecode of the encoded subtitle relative to the start time of the Cluster element. Although not shown in the illustrated embodiment, each Cluster element 48 likely would include additional BlockGroup elements containing additional encoded video, audio or subtitles. Despite the multiplexing of the encoded video, audio, and/or subtitle streams, the same constraints concerning the encoded media apply.

Incorporating Trick Play Tracks in MKV Container Files for Use in Adaptive Bitrate Streaming Systems The incorporation of trick play tracks within Matroska container files is proposed by DivX, LLC in U.S. patent application Ser. No. 12/260,404 entitled "Application Enhancement Tracks", filed Oct. 29, 2008, the disclosure of which is hereby incorporated by reference in its entirety. Trick play tracks similar to the trick play tracks described in U.S. patent application Ser. No. 12/260,404 can be used to provide a trick play stream in an adaptive bitrate streaming system in accordance with an embodiment of the invention to provide smooth visual search through source content encoded for adaptive bitrate streaming. A separate trick play track can be encoded that appears to be an accelerated visual search through the source media when played back, when in reality the trick play track is simply a separate track encoding the source media at a lower frame rate. In several embodiments, the tick play stream is created by generating a trick play track in the manner outlined in U.S. patent application Ser. No. 12/260,404 and inserting the trick play track into a Matroska container file subject to the constraints mentioned above with respect to insertion of a video stream into a Matroksa container file. In many embodiments, the trick play track is also subject to the further constraint that every frame in the GOP of each Cluster element in the trick play track is encoded as an IDR frame. As with the other video streams, each Cluster element contains a GOP corresponding to the same two seconds of source media as the corresponding Cluster elements in the other streams. There are simply fewer frames in the GOPs of the trick play track and each frame has a longer duration. In this way, transitions to and from a trick play stream can be treated in the same way as transitions between any of the other encoded streams are treated within an adaptive bitrate streaming system in accordance with embodiments of the invention. Playback of the frames contained within the trick play track to achieve accelerated visual search typically involves the playback device manipulating the timecodes assigned to the frames of encoded video prior to providing the frames to the playback device's decoder to achieve a desired increase in rate of accelerated search (e.g. ×2, ×4, ×6, etc.).

Figure 9E:
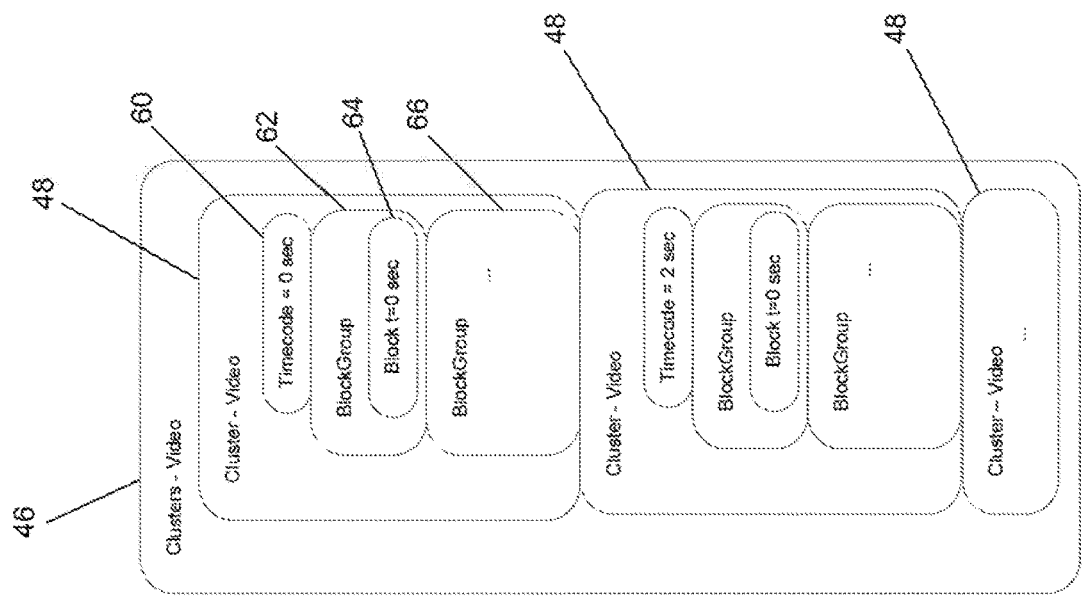
FIG. 9*e* conceptually illustrates the inclusion of a trick play track into the Clusters element of a Matroska container file subject to various constraints that facilitate adaptive bitrate streaming in accordance with an embodiment of the invention.

A Clusters element containing encoded media from a trick play track is shown in FIG. 9*e*. In the illustrated embodiment, the encoded trick play track is inserted within the Cluster elements 48 subject to the same constraints applied to the encoded video discussed above with respect to FIG. 9*a*. However, each Block element contains an IDR. In other embodiments, the Cluster elements within the container files containing the trick play tracks need not correspond with the start time and duration of the Cluster elements in the container files containing the alternative video streams.

In many embodiments, source content can be encoded to provide a single trick play track or multiple trick play tracks for use by the adaptive bit rate streaming system. When a single trick play track is provided, the trick play track is typically encoded at a low bitrate. When multiple alternative trick play tracks are provided, adaptive rate streaming can also be performed with respect to the trick play tracks. In several embodiments, multiple trick play tracks are provided to support different rates of accelerated visual search through the encoded media.

Incorporating Indexing Information within MKV Container Files

Figure 10:
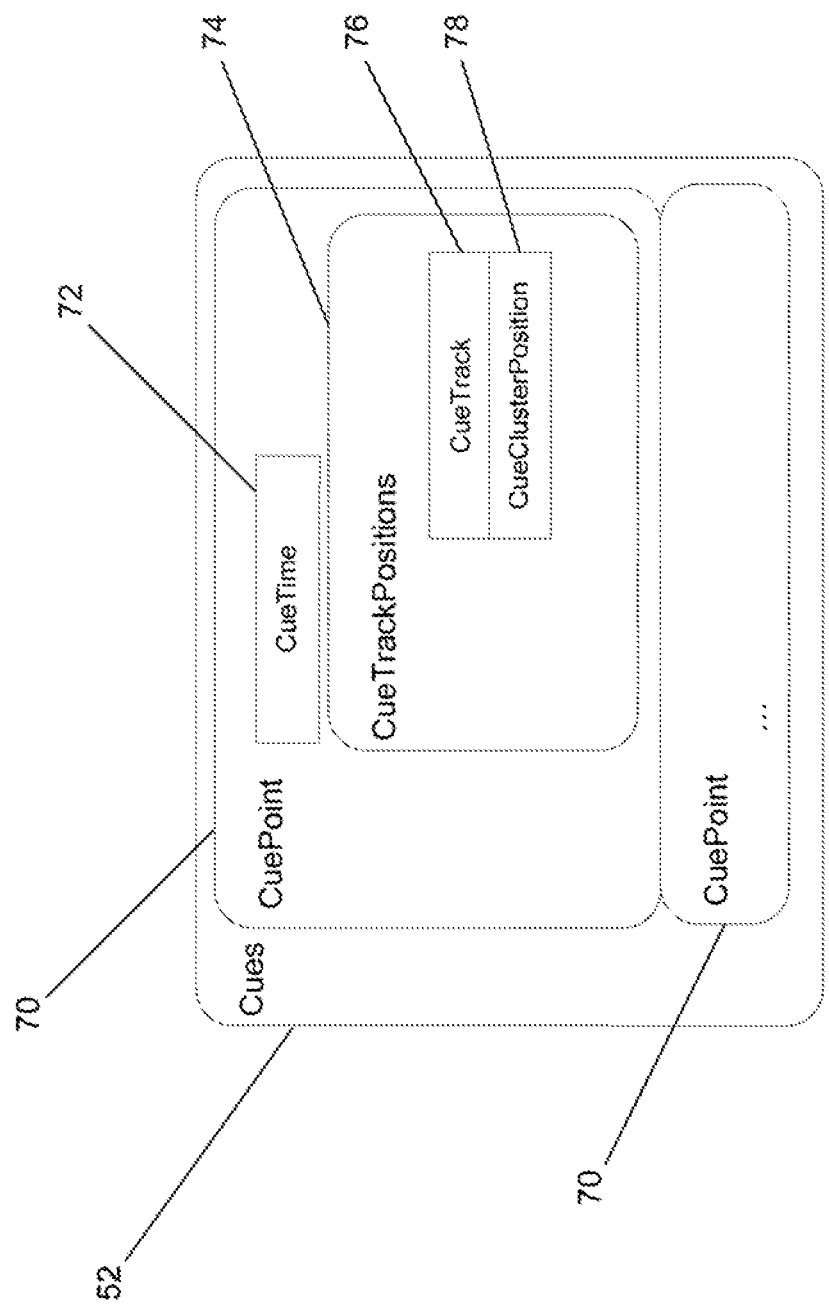
FIG. 10 conceptually illustrates a modified Cues element of a specialized Matroska container file, where the Cues element includes information enabling the retrieval of Cluster elements using HTTP byte range requests in accordance with an embodiment of the invention.

The specification for the Matroska container file format provides for an optional Cues element that is used to index Block elements within the container file. A modified Cues element 52 that can be incorporated into a Matroska container file in accordance with an embodiment of the invention to facilitate the requesting of clusters by a playback device using HTTP is illustrated in FIG. 10. The modified Cues element 52 includes a plurality of CuePoint elements 70 that each include a CueTime attribute 72. Each CuePoint element includes a CueTrackPositions element 74 containing the CueTrack 76 and CueClusterPosition 78 attributes. In many embodiments, the CuePoint element is mainly configured to identify a specific Cluster element as opposed to a specific Block element within a Cluster element. Although, in several applications the ability to seek to specific BlockGroup elements within a Cluster element is required and additional index information is included in the Cues element.

Figure 11:
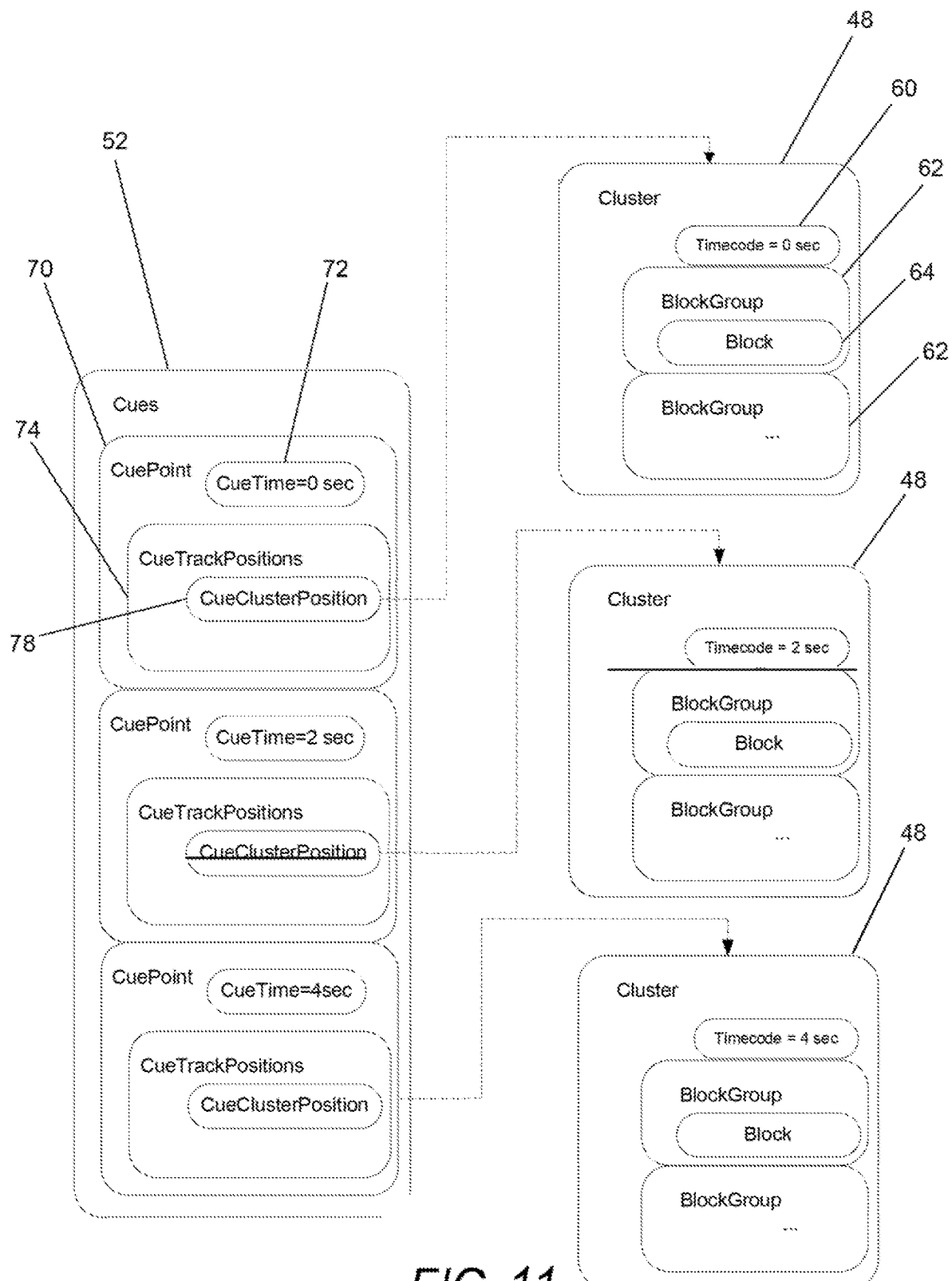
FIG. 11 conceptually illustrates the indexing of Cluster elements within a specialized Matroska container file utilizing modified CuePoint elements within the container file in accordance with embodiments of the invention.

The use of a modified Cues element to index encoded media within a Clusters element of a Matroska file in accordance with an embodiment of the invention is illustrated in FIG. 11. A CuePoint element is generated to correspond to each Cluster element within the Matroska container file. The CueTime attribute 72 of the CuePoint element 70 corresponds to the Timecode attribute 60 of the corresponding Cluster element 48. In addition, the CuePoint element contains a CueTrackPositions element 74 having a CueClusterPosition attribute 78 that points to the start of the corresponding Cluster element 48. The CueTrackPositions element 74 can also include a CueBlockNumber attribute, which is typically used to indicate the Block element containing the first IDR frame within the Cluster element 48.

As can readily be appreciated the modified Cues element 52 forms an index to each of the Cluster elements 48 within the Matroska container file. Furthermore, the CueTrackPosition elements provide information that can be used by a playback device to request the byte range of a specific Cluster element 48 via HTTP or another suitable protocol from a remote server. The Cues element of a conventional Matroska file does not directly provide a playback device with information concerning the number of bytes to request from the start of the Cluster element in order to obtain all of the encoded video contained within the Cluster element. The size of a Cluster element can be inferred in a modified Cues element by using the CueClusterPosition attribute of the CueTrackPositions element that indexes the first byte of the next Cluster element. Alternatively, additional CueTrackPosition elements could be added to modified Cues elements in accordance with embodiments of the invention that index the last byte of the Cluster element (in addition to the CueTrackPositions elements that index the first byte of the Cluster element), and/or a non-standard CueClusterSize attribute that specifies the size of the Cluster element pointed to by the CueClusterPosition attribute is included in each CueTrackPosition element to assist with the retrieval of specific Cluster elements within a Matroska container file via HTTP byte range requests or a similar protocol.

The modification of the Cues element in the manner outlined above significantly simplifies the retrieval of Cluster elements from a Matroska container file via HTTP or a similar protocol during adaptive bitrate streaming. In addition, by only indexing the first frame in each Cluster the size of the index is significantly reduced. Given that the index is typically downloaded prior to playback, the reduced size of the Cues element (i.e. index) means that playback can commence more rapidly. Using the CueClusterPosition elements, a playback device can request a specific Cluster element from the stream most suited to the streaming conditions experienced by the playback device by simply referencing the index of the relevant Matroska container file using the Timecode attribute for the desired Cluster element.

Figure 10A:
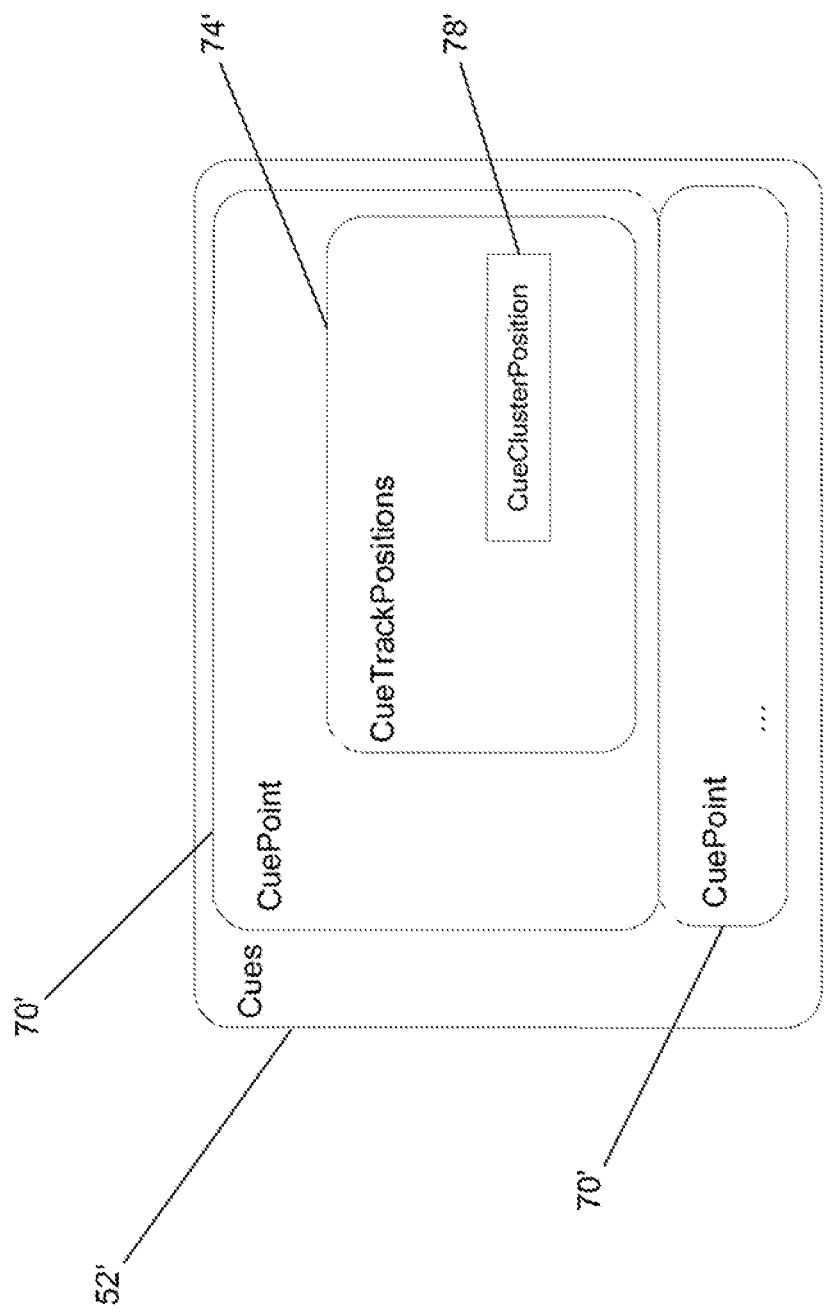
FIG. 10*a* conceptually illustrates a modified Cues element of a specialized Matroska container file in accordance with an embodiment of the invention, where the Cues element is similar to the Cues element shown in FIG. 5 with the exception that attributes that are not utilized during adaptive bitrate streaming are removed.

In some embodiments, a number of the attributes within the Cues element are not utilized during adaptive bitrate streaming. Therefore, the Cues element can be further modified by removing the unutilized attributes to reduce the overall size of the index for each Matroska container file. A modified Cues element that can be utilized in a Matroska container file that includes a single encoded stream in accordance with an embodiment of the invention is illustrated in FIG. 10*a*. The Cues element 52' shown in FIG. 10*a* is similar to the Cues element 52 shown in FIG. 10 with the exception that the CuePoint elements 70' do not include a CueTime attribute (see 72 in FIG. 10) and/or the CueTrackPositions elements 74' do not include a CueTrack attribute (76 in FIG. 10). When the portions of encoded media in each Cluster element in the Motroska container file have the same duration, the CueTime attribute is not necessary. When the Matroska contain file includes a single encoded stream, the CueTrack attribute is not necessary. In other embodiments, the Cues element and/or other elements of the Matroska container file can be modified to remove elements and/or attributes that are not necessary for the adaptive bitrate streaming of the encoded stream contained within the Matroska container file, given the manner in which the stream is encoded and inserted in the Matroska container file.

Although various modifications to the Cues element to include information concerning the size of each of the Cluster elements within a Matroska container file and to eliminate unnecessary attributes are described above, many embodiments of the invention utilize a conventional Matroska container. In several embodiments, the playback device simply determines the size of Cluster elements on the fly using information obtained from a conventional Cues element, and/or relies upon a separate index file containing information concerning the size and/or location of the Cluster elements within the MKV container file. In several embodiments, the additional index information is stored in the top level index file. In a number of embodiments, the additional index information is stored in separate files that are identified in the top level index file. When index information utilized to retrieve Cluster elements from a Matroska container file is stored separately from the container file, the Matroska container file is still typically constrained to encode media for inclusion in the Cluster elements in the manner outlined above. In addition, wherever the index information is located, the index information will typically index each Cluster element and include (but not be limited to) information concerning at least the starting location and, in many instances, the size of each Cluster element.

Encoding Source Media for Adaptive Bitrate Streaming

Figure 12:
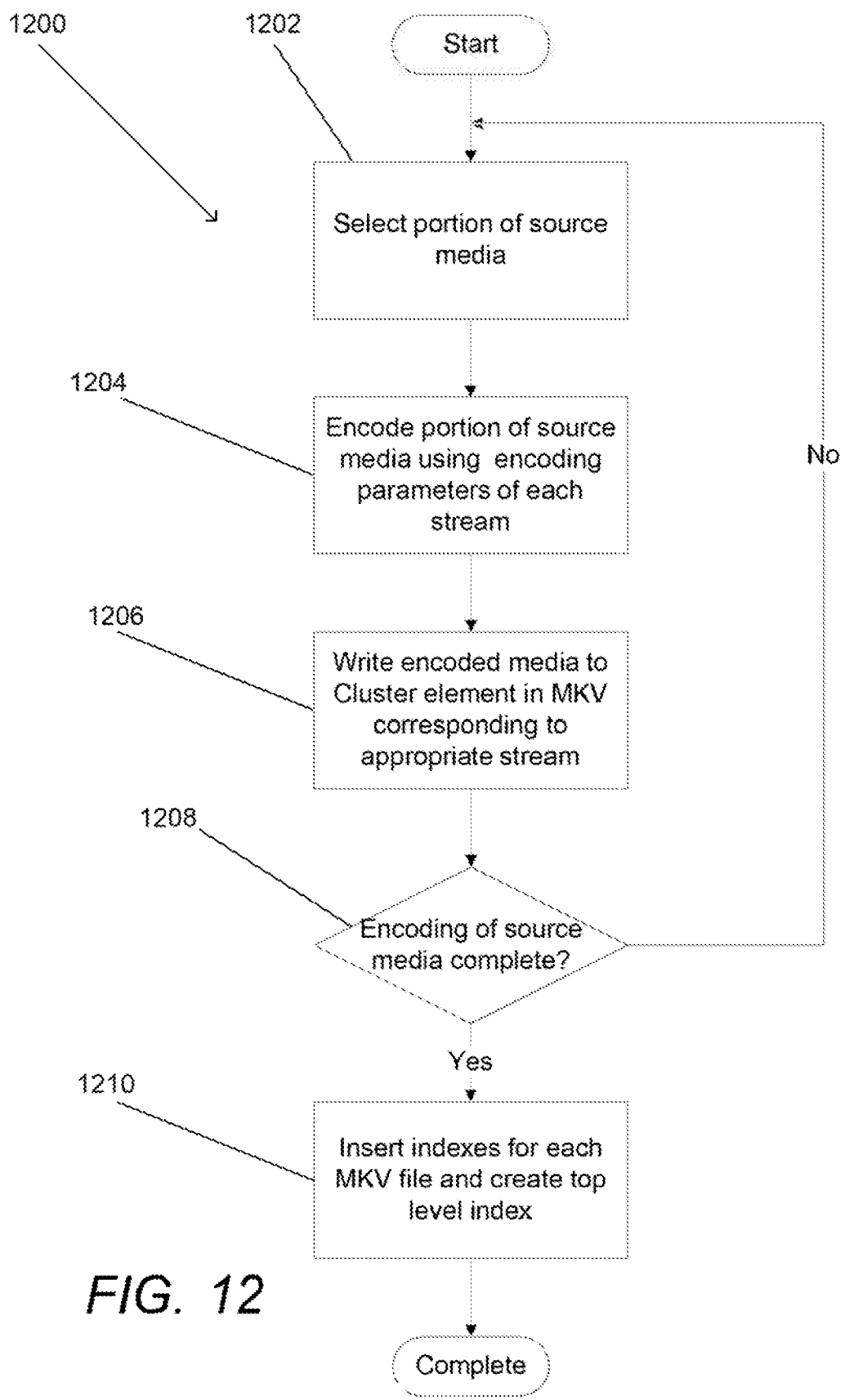
FIG. 12 is a flow chart illustrating a process for encoding source media for adaptive bitrate streaming in accordance with an embodiment of the invention.

A process for encoding source media as a top level index file and a plurality of Matroska container files for use in an adaptive bitrate streaming system in accordance with an embodiment of the invention is illustrated in FIG. 12. The encoding process 1200 commences by selecting (1202) a first portion of the source media and encoding (1204) the source media using the encoding parameters for each stream. When the portion of media is video, then the portion of source video is encoded as a single GOP commencing with an IDR frame. In many embodiments, encoding parameters used to create the alternative GOPs vary based upon bitrate, frame rate, encoding parameters and resolution. In this way, the portion of media is encoded as a set of interchangeable alternatives and a playback device can select the alternative most appropriate to the streaming conditions experienced by the playback device. When different resolutions are supported, the encoding of the streams is constrained so that each stream has the same display aspect ratio. A constant display aspect ratio can be achieved across different resolution streams by varying the sample aspect ratio with the resolution of the stream. In many instances, reducing resolution can result in higher quality video compared with higher resolution video encoded at the same bit rate. In many embodiments, the source media is itself encoded and the encoding process (1200) involves transcoding or translating of the encoded source media according to the encoding parameters of each of the alternative streams supported by the adaptive bitrate streaming system.

Once the source media has been encoded as a set of alternative portions of encoded media, each of the alternative portions of encoded media is inserted (1206) into a Cluster element within the Matroska container file corresponding to the stream to which the portion of encoded media belongs. In many embodiments, the encoding process also constructs indexes for each Matroska container file as media is inserted into Cluster elements within the container. Therefore, the process 1200 can also include creating a CuePoint element that points to the Cluster element inserted within the Matroska container file. The CuePoint element can be held in a buffer until the source media is completely encoded. Although the above process describes encoding each of the alternative portions of encoded media sequentially in a single pass through the source media, many embodiments of the invention involve performing a separate pass through the source media to encode each of the alternative streams.

Referring back to FIG. 12, the process continues to select (1202) and encode (1204) portions of the source media and then insert (1206) the encoded portions of media into the Matroska container file corresponding to the appropriate stream until the entire source media is encoded for adaptive bitrate streaming (1208). At which point, the process can insert an index (1210) into the Matroska container for each stream and create (1212) a top level index file that indexes each of the encoded streams contained within the Matroska container files. As noted above, the indexes can be created as encoded media and inserted into the Matroska container files so that a CuePoint element indexes each Cluster element within the Mastroska container file. Upon completion of the encoding, each of the CuePoint elements can be included in a Cues element and the Cues element can be inserted into the Matroska container file following the Clusters element.

Following the encoding of the source media to create Matroska container files containing each of the streams generated during the encoding process, which can include the generation of trick play streams, and a top level index file that indexes each of the streams within the Matroska container files, the top level index file and the Matroska container files can be uploaded to an HTTP server for adaptive bitrate streaming to playback devices. The adaptive bitrate streaming of media encoded in accordance with embodiments of the invention using HTTP requests is discussed further below.

Source Encoders

Figure 2:
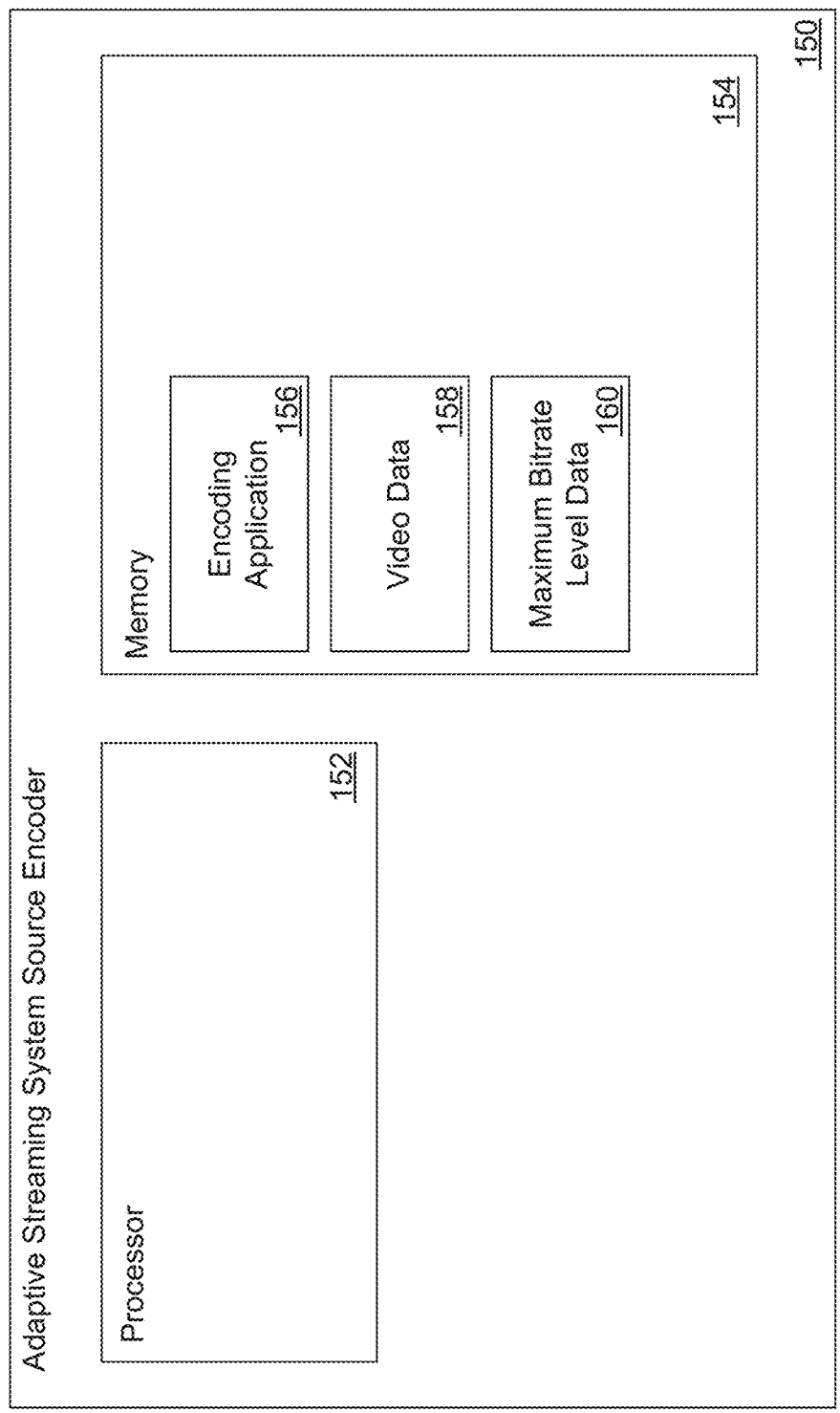
FIG. 2 conceptually illustrates a playback device configured to deliver video data encoded utilizing target maximum bitrate levels in accordance with an embodiment of the invention.

Source encoders in accordance with embodiments of the invention are utilized to encode source content at any of a number of resolutions and frame rates at target maximum bitrates determined using a set of predetermined maximum bitrate levels. The basic architecture of a source encoder in accordance with an embodiment of the invention is illustrated in FIG. 2. The source encoder 150 includes a processor 152 in communication with memory 154. In the illustrated embodiment, the memory 154 includes an encoding application 156, video data 158, which can include (but is not limited to) source video data and encoded alternative streams of video data, and data describing the target maximum bitrates at which to encode a plurality of resolution and frame rate combinations 160. In many embodiments, the target maximum bitrates are selected from a set of predetermined maximum bitrate levels that includes a number of levels that is smaller than the number of resolution and frame rate combinations. In certain embodiments, a plurality of resolution and frame rate combinations is associated with each of a plurality of maximum bitrate levels. In several embodiments, the data concerning target maximum bitrate levels is a lookup table that is indexed by resolution and frame rate combinations and associates specific maximum bitrate levels with specific resolution and frame rate combinations. In other embodiments, any of a variety of data structures can be utilized to identify a target maximum bitrate from a predetermined set of target maximum bitrates to utilize in the encoding of a specific resolution and frame rate combination.

Although a specific architecture is illustrated in FIG. 2, any of a variety of architectures including architectures where the application and/or set of predetermined maximum bitrate levels are located on disk or some other form of storage and is loaded into memory at runtime can be utilized to implement a source encoder in accordance with an embodiment of the invention. Furthermore, any of a variety of system architectures including (but not limited to) the system architecture illustrated in FIG. 1 can be utilized to perform video delivery in accordance with embodiments of the invention. Systems and methods for determining a predetermined set of maximum bitrate levels at which to encode video at a plurality of resolution and frame combinations in accordance with embodiments of the invention are discussed further below.

Determining Target Maximum Bitrates

The initial step in determining a set of predetermined bitrates at which to encode video is determining the characteristics of the video that is likely to be streamed by a streaming system. Once the resolution and frame rate combinations of the video that is likely to be streamed are identified, the optimal target maximum bitrate of each resolution and frame rate combination can be calculated and the results used to determine a set of maximum bitrate levels at which video can be encoded for different resolution and frame rate combinations. The term optimal target maximum bitrate can be used to describe the maximum bitrate beyond which video quality at a specific resolution and frame rate does not appreciably increase. Stated another way, the optimal target maximum bitrate is the lowest bitrate at which the highest quality video can be achieved at a given resolution and frame rate. In using a term such as optimal target maximum bitrate, there is typically an acknowledgement that video quality is subjective. Therefore, there is no concept of a "true" optimal target maximum bitrate. The optimal target maximum bitrate is simply a value that can be determined through subjective experimentation. In many instances, observations concerning target maximum bitrates have resulted in the definition of functions that can be utilized to calculate an optimal target maximum bitrate based upon the resolution and frame rate. As is discussed further below, the technique for determining an optimal target maximum bitrate is not as important as the manner in which that maximum bitrates are utilized to select maximum bitrate levels.

Figure 3:
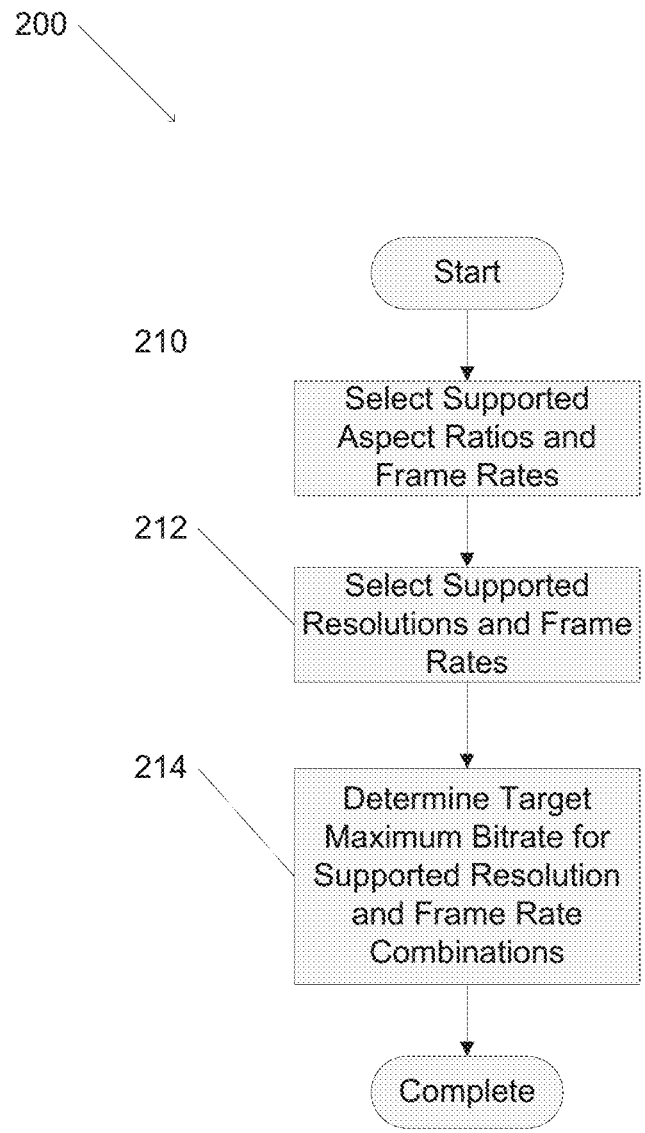
FIG. 3 is a flow chart illustrating a process for determining a set of bitrates given video data in accordance with an embodiment of the invention.

A process for determining optimal target maximum bitrates for video streamed within an adaptive bitrate streaming system in accordance with embodiments of the invention is illustrated in FIG. 3. The process 200 commences by selecting 210 display aspect ratios and frame rates supported by the streaming system. The display aspect ratios and frame rates are typically determined based upon popular display aspect ratios and frame rates supported by playback devices that are likely to be used to stream video within the streaming system. Resolutions can be determined 212 based upon the selected display aspect ratios and, in many instances, based upon anticipated maximum data rates supported within the streaming system. Processes for determining resolutions at which to encode alternative video streams based upon the display aspect ratio of a playback device are described in U.S. patent application Ser. No. 13/430,032 entitled "Selection of Resolutions for Seamless Resolution Switching of Multimedia Content" to Soroushian et al., filed Mar. 26, 2012 (incorporated by reference above).

An optimal target maximum bitrate is determined (214) for each selected frame rate and resolution combination. In several embodiments, maximum bitrate targets are determined 214 utilizing a bitrate formula where the bitrate formula may utilize various aspects of the video data, including frame rate, resolution, and other pertinent information as input. Examples of appropriate bitrate formulas are described in U.S. Patent Application No. "Systems and Methods for Encoding Alternative Streams of Video for Playback on Playback Devices having Predetermined Display Aspect Ratios and Network Connection Maximum Data Rates", to Soroushian et al., filed Mar. 28, 2012 (incorporated by reference above). In a number of embodiments, the determination (214) of the optimal target maximum bitrate for a specific resolution and frame rate combination may involve subjective or objective quality evaluation methods of the video data encoded at the target maximum bitrate. Once the optimal target maximum bitrates for each of the resolution and frame rate combinations is determined, a process can then be performed to identify a set of maximum bitrate can be selected based upon the optimal target maximum bitrates. Processes for determining a set of maximum bitrate levels based upon a set of optimal target maximum bitrates associated with specific resolution and frame rate combinations in accordance with embodiments of the invention are discussed below.

Generating Sets of Maximum Bitrate Levels

Figure 4:
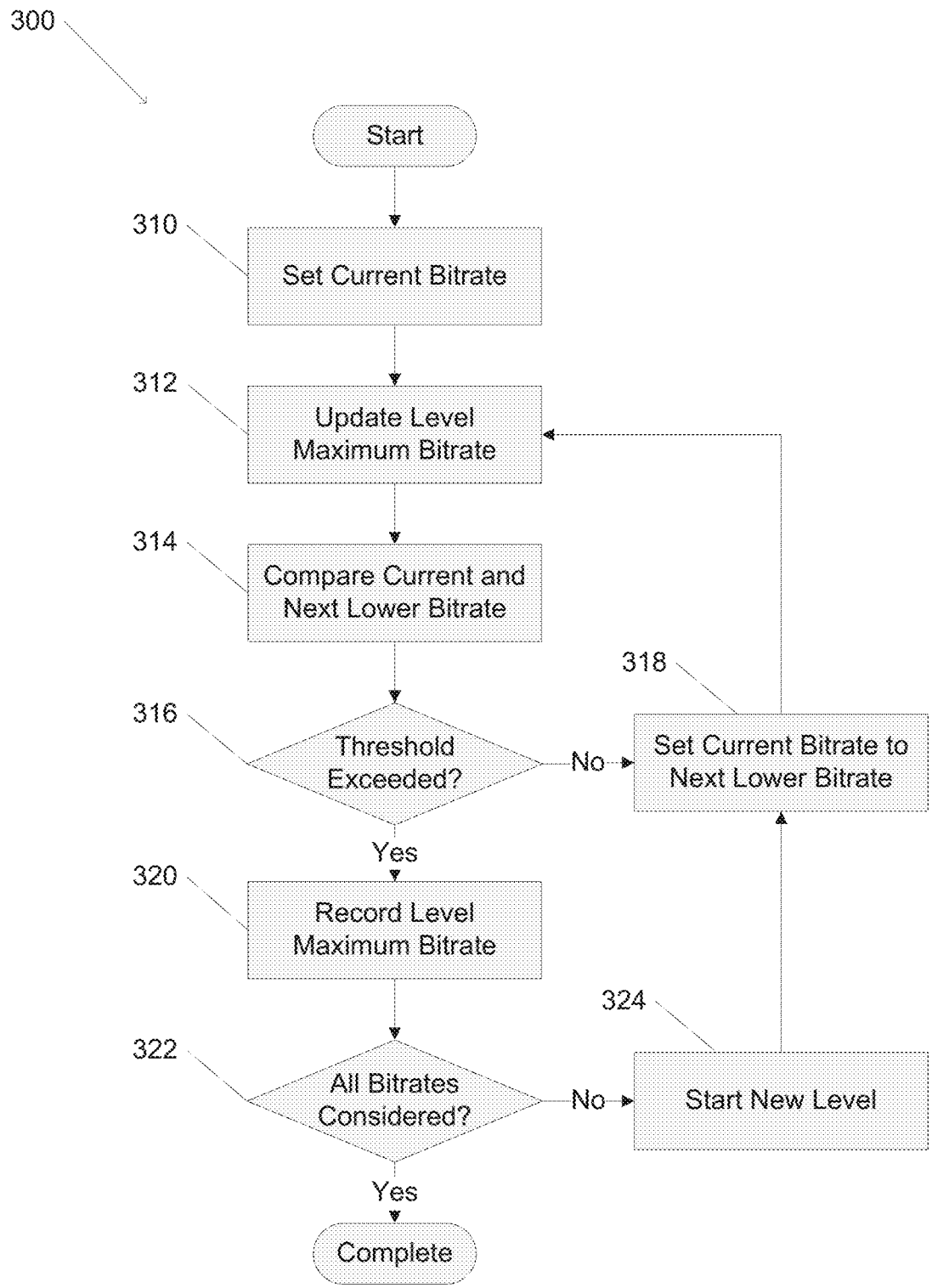
FIG. 4 is a flow chart illustrating a process for determining a set of encoding maximum bitrate levels in accordance with an embodiment of the invention.

A process for determining a set of maximum bitrate levels based upon a set of optimal target maximum bitrates associated with specific resolution and frame rate combinations in accordance with an embodiment of the invention is illustrated in FIG. 4. The process 300 involves setting (310) the current bitrate to the highest optimal target maximum bitrate from a set of optimal target maximum bitrates. The level maximum bitrate is updated (312) utilizing the current bitrate. In many embodiments, the level maximum bitrate may be set to the average, median, minimum, or maximum combination of the bitrates in the current bitrate level. In a number of embodiments, the level average bitrate is a linear or non-linear combination of the bitrates in the current bitrate level. In other embodiments, the level maximum bitrate can be determined after all of the levels are identified.

The current bitrate is compared (314) to the next lower optimal target maximum bitrate in the input set of optimal target maximum bitrates. A decision (316) is then made. Given a threshold value, if the difference between the current bitrate and the next lower optimal target maximum bitrate does not exceed the threshold value, the current bitrate is included in the optimal maximum bitrate level. In other embodiments, any of a variety of criteria can be utilized to determine whether to include a specific resolution and frame rate combination in a level based upon the optimal target maximum bitrate for the resolution and frame combination. Accordingly, the current bitrate is set (318) to the next lower optimal target maximum bitrate and the process loops back to updating (312) the level maximum bitrate. In several embodiments, the threshold value is a percentage difference between consecutive bitrate levels, such as 10%. In several embodiments, the threshold value is a fixed value or is related in a non-linear manner to the value of the current bitrate. If the threshold value is exceeded, the level maximum bitrate is recorded (320) in the set of maximum bitrate levels. In several embodiments, the level bitrate level is rounded to the closest whole number. Another decision (322) is made. If target maximum bitrates remain to be considered, a new level bitrate is started (324), the current bitrate is set (318) to the next highest optimal target maximum bitrate, and the process continues updating (312) the level maximum bitrate of the new level. The process 300 is complete when all bitrates have been considered.

In a number of embodiments, the maximum bitrate levels and the resolutions and frame rates assigned to specific groups can be modified in accordance with the requirements of a specific application. For example, the optimal maximum bitrate at each level can be rounded down (or up) to the closest whole-number multiple of 10, 100 or 1000. Although a specific process is illustrated in FIG. 4, any of a variety of processes can be utilized including a process that groups resolution and frame rate combinations into a predetermined number of levels based upon one or more criteria including (but not limited to) maximizing the similarity of the optimal target maximum bitrates of the resolution and frame combinations at each level.

An example of a grouping of a set of maximum bitrate levels defined based on the resolution, and frame rate of encoded video in accordance with an embodiment of the invention is illustrated in FIG. 5.

For example, in many embodiments of the invention 1440×816 is a sub-resolution for video data having a primary resolution of 1920×816 at 24 frames per second with a sample aspect ratio of 4:3. Likewise, the resolution 1440×800 is a sub-resolution for video data having a primary resolution of 1920×800 at 24 frames per second with a sample aspect ratio of 4:3. The encoded maximum bitrate of the 1440×816 video is 3,557 Kbps and the encoded maximum bitrate of the 1440×800 video is 3,459 Kbps. In several embodiments, 1440×816 and 1440×800 are within a threshold value of each other and no other resolutions are within the threshold value. The average bitrate for these resolutions is 3,508 Kbps, rounded to 3,500 Kbps. In accordance with an embodiment of the invention, 3,500 Kbps will be one maximum bitrate in the set of maximum profile bitrates.

In order to stream video content at each maximum bitrate level, a variety of resolutions may be utilized depending on the sample aspect ratio and frame rate of the source content. An example profile of recommended resolutions based on the frame rate and primary aspect ratio of the video content for various maximum bitrates is illustrated in FIG. 6. In many embodiments of the invention, the same resolution may be utilized for multiple frame rates and sample aspect ratios in order to maximize the subjective and/or objective quality of the streamed video data.

Although the present invention has been described in certain specific aspects, many additional modifications and variations would be apparent to those skilled in the art. It is therefore to be understood that the present invention may be practiced otherwise than specifically described, including playback devices where the set of streaming switching conditions utilized by the playback device are continuously changing, without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A content distribution system comprising:
   a set of one or more encoding servers, wherein each server of the set of encoding servers comprises:
      a non-volatile storage containing an encoder application; and
      at least one processor;
   wherein the encoder applications cause the set of encoding servers to encode source content as a set of streams that are each stored in separate container files, each container files comprising a set of one or more alternative video streams, each having a frame rate and a bitrate, by causing the processor to perform the steps of:
      identifying a plurality of sections of the source content;
      identifying a plurality of resolution and frame rate combinations for encoding of video content;
      determining an optimal target maximum bitrate for each of the received plurality of resolution and frame rate combinations, wherein an optimal target maximum bitrate is the lowest bitrate at which a highest video quality criterion is satisfied for a specific resolution and frame rate combination;

determining a plurality of maximum bitrate levels based on the determined optimal target maximum bitrates, wherein each of the plurality of resolution and frame rate combinations is associated with one of the plurality of maximum bitrate levels;

for each particular section of the plurality of sections, encoding the particular section to produce a plurality of encodings of the particular section for each of the plurality of alternative video streams, wherein each of the plurality of alternative video streams is encoded at one of the plurality of maximum bitrate levels and an associated resolution and frame rate combination;

assembling the encodings of the plurality of sections for a given video stream from the plurality of alternative video streams a container file for each of the plurality of alternative video streams by:

assembling the encodings of the plurality of sections for a given video stream from the plurality of alternative video streams into a video container file; and generating entries in a container index within the video container file indicating sizes of portions of the given video stream within the video container file; and uploading the container files for each of the plurality of alternative video streams to a set of servers that form part of a content distribution system.

2. The content distribution system of claim 1, wherein the optimal target maximum bitrates are determined using a formula.

3. The content distribution system of claim 1, wherein the optimal target maximum bitrate of a resolution and frame rate combination is determined using experimentation.

4. The content distribution system of claim 1, wherein determining a plurality of maximum bitrate levels comprises:

grouping the plurality of resolution and frame rate combinations into a plurality of maximum bitrate levels based upon determined optimal target maximum bitrates, and determining a target maximum bitrate for each of the plurality of maximum bitrate levels, wherein the determined target maximum bitrates are the bitrates at which the video content is encoded.

5. The content distribution system of claim 1, wherein the resolution and frame rate combinations associated with a maximum bitrate level have optimal target maximum bitrates that are within a predetermined percentage of the highest optimal target maximum bitrate of a resolution and frame rate combination within the maximum bitrate level.

6. The content distribution system of claim 1, wherein the resolution and frame rates within a maximum bitrate level have optimal target maximum bitrates that are within a predetermined percentage of the optimal target maximum bitrate of at least one other resolution and frame rate combination within the maximum bitrate level.

7. The content distribution system of claim 1, wherein both a width and a height of each resolution of the plurality of resolution and frame rate combinations have an integer number of pixels.

8. The content distribution system of claim 1, wherein each resolution of the plurality of resolution and frame rate combinations has a same display aspect ratio.

9. The content distribution system of claim 8, wherein at least two resolutions of the plurality of resolution and frame rate combinations have different sample aspect ratios.

10. A method, for encoding source content as a set of streams that are each stored in separate container files, each container files comprising a set of one or more alternative video streams, each having a frame rate and a bitrate, the method comprising:

identifying a plurality of sections of the source content;

identifying a plurality of resolution and frame rate combinations for encoding of video content;

determining an optimal target maximum bitrate for each of the received plurality of resolution and frame rate combinations, wherein an optimal target maximum bitrate is the lowest bitrate at which a highest video quality criterion is satisfied for a specific resolution and frame rate combination;

determining a plurality of maximum bitrate levels based on the determined optimal target maximum bitrates, wherein each of the plurality of resolution and frame rate combinations is associated with one of the plurality of maximum bitrate levels;

for each particular section of the plurality of sections, encoding the particular section to produce a plurality of encodings of the particular section for each of the plurality of alternative video streams, wherein each of the plurality of alternative video streams is encoded at one of the plurality of maximum bitrate levels and an associated resolution and frame rate combination;

assembling the encodings of the plurality of sections for a given video stream from the plurality of alternative video streams a container file for each of the plurality of alternative video streams by:

assembling the encodings of the plurality of sections for a given video stream from the plurality of alternative video streams into a video container file; and generating entries in a container index within the video container file indicating sizes of portions of the given video stream within the video container file; and uploading the container files for each of the plurality of alternative video streams to a set of servers that form part of a content distribution system.

11. The method of claim 10, wherein the optimal target maximum bitrates are determined using a formula.

12. The method of claim 10, wherein the optimal target maximum bitrate of a resolution and frame rate combination is determined using experimentation.

13. The method of claim 10, wherein determining a plurality of maximum bitrate levels comprises:

grouping the plurality of resolution and frame rate combinations into a plurality of maximum bitrate levels based upon determined optimal target maximum bitrates, and determining a target maximum bitrate for each of the plurality of maximum bitrate levels, wherein the determined target maximum bitrates are the bitrates at which the video content is encoded.

14. The method of claim 10, wherein the resolution and frame rate combinations associated with a maximum bitrate level have optimal target maximum bitrates that are within a predetermined percentage of the highest optimal target maximum bitrate of a resolution and frame rate combination within the maximum bitrate level.

15. The method of claim 10, wherein the resolution and frame rates within a maximum bitrate level have optimal target maximum bitrates that are within a predetermined percentage of the optimal target maximum bitrate of at least one other resolution and frame rate combination within the maximum bitrate level.

16. The method of claim 10, wherein both a width and a height of each resolution of the plurality of resolution and frame rate combinations have an integer number of pixels.

17. The method of claim 10, wherein each resolution of the plurality of resolution and frame rate combinations has a same display aspect ratio.

18. The method of claim 17, wherein at least two resolutions of the plurality of resolution and frame rate combinations have different sample aspect ratios.

* * * * *

UNITED STATES PATENT AND TRADEMARK OFFICE
CERTIFICATE OF CORRECTION

PATENT NO. : 10,645,429 B2  
APPLICATION NO. : 15/922198  
DATED : May 5, 2020  
INVENTOR(S) : Kourosh Soroushian Page 1 of 1

It is certified that error appears in the above-identified patent and that said Letters Patent is hereby corrected as shown below:

In the Claims

Claim 1, Column 22, Line 59, "files" should be changed to --file--; Line 67, "received" should be changed to --identified--.
Claim 10, Column 24, Line 9, "files" should be changed to --file--; Line 17, "received" should be changed to --identified--.

Signed and Sealed this  
Fifteenth Day of March, 2022

Drew Hirshfeld  
*Performing the Functions and Duties of the*  
*Under Secretary of Commerce for Intellectual Property and*  
*Director of the United States Patent and Trademark Office*